US010862692B2

(12) United States Patent
Shahrjerdi et al.

(10) Patent No.: US 10,862,692 B2
(45) Date of Patent: Dec. 8, 2020

(54) SYSTEMS AND METHODS FOR OPTICAL PHYSICAL UNCLONABLE PARAMETERS

(71) Applicant: NEW YORK UNIVERSITY, New York, NY (US)

(72) Inventors: Davood Shahrjerdi, New York, NY (US); Abdullah Alharbi, Brooklyn, NY (US)

(73) Assignee: NEW YORK UNIVERSITY, New York, NY (US)

( * ) Notice: Subject to any disclaimer, the term of this patent is extended or adjusted under 35 U.S.C. 154(b) by 314 days.

(21) Appl. No.: 15/847,460

(22) Filed: Dec. 19, 2017

(65) Prior Publication Data

US 2018/0205564 A1 Jul. 19, 2018

Related U.S. Application Data

(60) Provisional application No. 62/436,956, filed on Dec. 20, 2016.

(51) Int. Cl.
*B32B 3/02* (2006.01)
*H04L 9/32* (2006.01)
*B05D 3/00* (2006.01)
*B05D 5/06* (2006.01)
(Continued)

(52) U.S. Cl.
CPC ............ *H04L 9/3278* (2013.01); *B05D 3/007* (2013.01); *B05D 5/061* (2013.01); *C09K 11/681* (2013.01); *H04L 9/0866* (2013.01)

(58) Field of Classification Search
CPC ....... H04L 9/3278; B05D 3/007; B05D 5/061; C09K 11/00; C09K 11/0805; C09K 11/681; C09K 11/881
See application file for complete search history.

(56) References Cited

U.S. PATENT DOCUMENTS 9,852,927 B2 * 12/2017 Amani ............... H01L 21/465
10,155,782 B2 * 12/2018 Wang ................ C07F 11/005
(Continued)

OTHER PUBLICATIONS

Alharbi, A., et al., "Electronic properties of monolayer tungsten disulfide grown by chemical vapor deposition", Applied Physics Letters 109, 2016, 193502, 5 pages.
(Continued)

*Primary Examiner* — Elizabeth E Mulvaney
(74) *Attorney, Agent, or Firm* — Foley & Lardner LLP

(57) ABSTRACT

An article of manufacture includes a substrate and a security primitive deposited on the substrate. The security primitive includes a transition metal dichalcogenide having a varying thickness. According to various embodiments, the transition metal dichalcogenide comprises a chalcogen atom (X) selected from the group consisting of S, Se, and Te and a transition metal (M) selected from the group consisting of Mo, W, Hf, and Zr. The security primitive is pixelated into a plurality of discrete regions having different luminescence. A security primitive key includes a first set of data values corresponding to a first set of coordinates of a first region and a second set of data values corresponding to a second set of coordinates of a second region. In some embodiments, the security primitive key is digitally captured through an optical reader and verified by querying a database.

21 Claims, 23 Drawing Sheets

(51) Int. Cl.
C09K 11/68 (2006.01)
H04L 9/08 (2006.01)

(56) References Cited

U.S. PATENT DOCUMENTS 10,260,154 B2* 4/2019 Manikoth ................. C25B 1/00
10,553,367 B2* 2/2020 El-Mellouhi ......... H01L 51/422

OTHER PUBLICATIONS

Alharbi, A., et al., "Material and device properties of superacid-treated monolayer molybdenum disulfide", Applied Physics Letters, 2017, 110:033503, 4 pages.
Avrami, M., "Kinetics of Phase Change. I General Theory", Journal of Chemical Physics, Dec. 1939, 7(12):1103-1112.
Bauer, E., "The many facets of metal epitaxy", in The Chemical Physics of Solid Surfaces: Growth and Properties of Ultrathin Epitaxial Layers, 1997, 8:46-65, Elsevier Science B.V.
Bilgin, I., et al., "Chemical Vapor Deposition Synthesized Atomically-Thin Molybdenum Disulfide with Optoelectronic-Grade Crystalline Quality", ACS Nano, 2015, 9(9):8822-8832.
Blumenthal, T., et al., "Patterned direct-write and screen-printing of NIR-to-visible upconverting inks for security applications", Nanotechnology, 2012, 23(18):185305, 8 pages.
Bohm, C., et al., "Sources of Mismatch and Errors", in Physical Unclonable Functions in Theory and Practice, 2013, pp. 105-130.
Clark, P.J., et al., "Distance to Nearest Neighbor as a Measure of Spatial Relationships in Populations", Ecology, Oct., 1954, 35(4):445-453.
Demas, J.N., et al., "The Measurement of Photoluminescence Quantum Yields. A Review", The Journal of Physical Chemistry, Apr. 15, 1971, 75(8):991-1024.
Elias, A.L., et al., "Controlled Synthesis and Transfer of Large-Area $WS_2$ Sheets: From Single Layer to Few Layers", ACS Nano, 2013, 7(6):5235-5242.
Fossum, E.R., et al., "A Review of the Pinned Photodiode for CCD and CMOS Image Sensors", IEEE Journal of the Electron Devices Society, May 2014, 2(3):33-43.
Franklin, A.D., et al., "Variability in Carbon Nanotube Transistors: Improving Device-to-Device Consistency", ACS Nano, 2012, 6(2):1109-1115.
Gassend, B., et al., "Silicon Physical Random Functions", Proceedings of the 9th ACM Conference on Computer and Communications Security, 2002, pp. 148-160.
Gong, Y., et al., "Direct growth of $MoS_2$ single crystals on polyimide substrates", 2D Materials, May 12, 2017, 4(2), 6 pages.
Han, S., et al., "Lithographically Encoded Polymer Microtaggant Using High-Capacity and Error-Correctable QR Code for Anti-Counterfeiting of Drugs", Advanced Materials, 2012, 24(44):5924-5929.
Handschuh, H., et al., "Hardware Intrinsic Security from Physically Unclonable Functions", in Information Security and Cryptography: Towards Hardware-Intrinsic Security, 2011, pp. 39-53, Springer-Verlag Berlin Heidelberg.
Helfmeier, C., et al., "Physical Vulnerabilities of Physically Unclonable Functions", IEEE, Design, Automation & Test in Europe Conference & Exhibition, 2014, 4 pages.
Herder, C., et al., "Physical Unclonable Functions and Applications: A Tutorial", Proceedings of the IEEE, Aug. 2014, 102(8):1126-1141.
Hu, Z., et al., "Physically unclonable cryptographic primitives using self-assembled carbon nanotubes", Nature Nanotechnology, Feb. 22, 2016, 11:559-565.
Huang, C., et al., "Unbreakable Codes in Electrospun Fibers: Digitally Encoded Polymers to Stop Medicine Counterfeiting", Advanced Materials, 2010, 22(24):2657-2662.
Kang, K., et al., "High-mobility three-atom-thick semiconducting films with wafer-scale homogeneity", Nature, Apr. 30, 2015, 520:656-660.
Kim, J., et al., "Anti-counterfeit nanoscale fingerprints based on randomly distributed nanowires", Nanotechnology, 2014, 25(15):155303, 7 pages.
Maes, R., "Physically Unclonable Functions: Constructions, Properties and Applications", Dissertation, Katholieke Universiteit Leuven, Aug. 2012, 260 pages.
Mak, K.F., et al., "Atomically Thin $MoS_2$: A New Direct-Gap Semiconductor", Physical Review Letters, Sep. 24, 2010, 105(13):136805, 4 pages.
Mukhopadhyay, D., et al., "Physically Unclonable Functions: A Root-of-Trust for Hardware Security", in Hardware Security: Design, Threats, and Safeguards, Oct. 29, 2014, pp. 475-494.
Najmaei, S., et al., "Vapour phase growth and grain boundary structure of molybdenum disulphide atomic layers", Nature Materials, Aug. 2013, 12:754-759.
Pappu, R., et al., "Physical One-Way Functions", Science, Sep. 20, 2002, 297(5589):2026-2030.
Park, H., et al., "High-density integration of carbon nanotubes via chemical self-assembly", Nature Nanotechnology, Dec. 2012, 7:787-791.
Perry, T., ed., "Why Hardware Engineers Have to Think Like Cybercriminals, and Why Engineers Are Easy to Fool," IEEE Spectrum, <https://spectrum.ieee.org/view-from-the-valley/computing/embedded-systems/why-hardware-engineers-have-to-think-like-cybercriminals-and-why-engineers-are-easy-to-fool>, May 15, 2017, 3 pages.
Pham, H.H., et al., "Polymer nanostructured material for the recording of biometric features", Journal of Materials Chemistry, 2007, 17(6):523-526.
Rostami, M., et al., "A Primer on Hardware Security: Models, Methods, and Metrics", Proceedings of the IEEE, Aug. 2014, 102(8):1283-1295.
Rostami, M., et al., "Hardware security: threat models and metrics," Proceedings of the International Conference on Computer-Aided Design, Nov. 18-21, 2013, pp. 819-823.
Salvatore, G.A., et al., "Fabrication and Transfer of Flexible Few-Layers $MoS_2$ Thin Film Transistors to Any Arbitrary Substrate", ACS Nano, 2013, 7(10):8809-8815.
Skoric, B., et al., "Robust key extraction from Physical Uncloneable Functions", Applied Cryptography and Network Security: Third International Conference, 2005, pp. 407-422.
Splendiani, A., et al., "Emerging Photoluminescence in Monolayer $MoS_2$", Nano Letters, 2010, 10(4):1271-1275.
Starink, M.J., "On the meaning of the impingement parameter in kinetic equations for nucleation and growth reactions", Journal of Materials Science, 2001, 36(18):4433-4441.
Van Der Zande, A.M., et al., "Grains and grain boundaries in highly crystalline monolayer molybdenum disulphide", Nature Materials, 2013, 12:554-561.
Venables, J.A., "Surface processes in epitaxial growth", in The Chemical Physics of Solid Surfaces: Growth and Properties of Ultrathin Epitaxial Layers, 1997, 8:1-45, Elsevier Science B.V.
Wang, Q.H., et al., "Electronics and optoelectronics of two-dimensional transition metal dichalcogenides", Nature Nanotechnology, 2012, 7:699-712.
Wang, S., et al., "Shape Evolution of Monolayer $MoS_2$ Crystals Grown by Chemical Vapor Deposition", Chemistry of Materials, 2014, 26(22):6371-6379.
Wurth, C., et al., "Relative and absolute determination of fluorescence quantum yields of transparent samples", Nature Protocols, 2013, 8:1535-1550.
Yablonovitch, E., et al., "Intensity Enhancement in Textured Optical Sheets for Solar Cells", IEEE Transactions on Electron Devices, Feb. 1982, 29(2):300-305.
Yu, Y., et al., "Controlled Scalable Synthesis of Uniform, High-Quality Monolayer and Few-layer $MoS_2$ Films", Scientific Reports, 2013, 3:1866, 6 pages.
Zhao, P., et al., "Measuring the Edge Recombination Velocity of Monolayer Semiconductors", Nano Letters, 2017, 17(9):5356-5360.

* cited by examiner

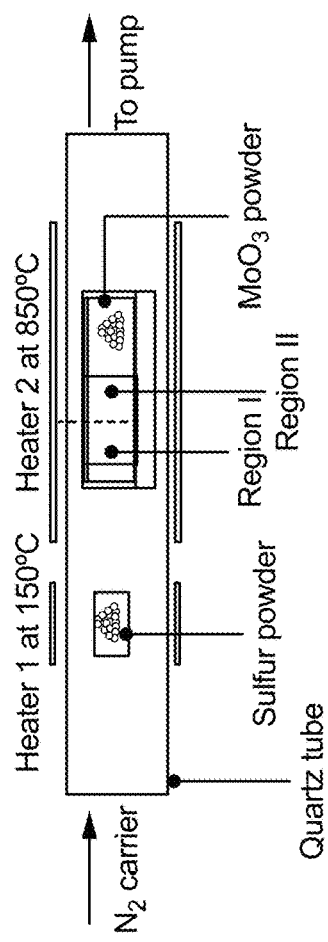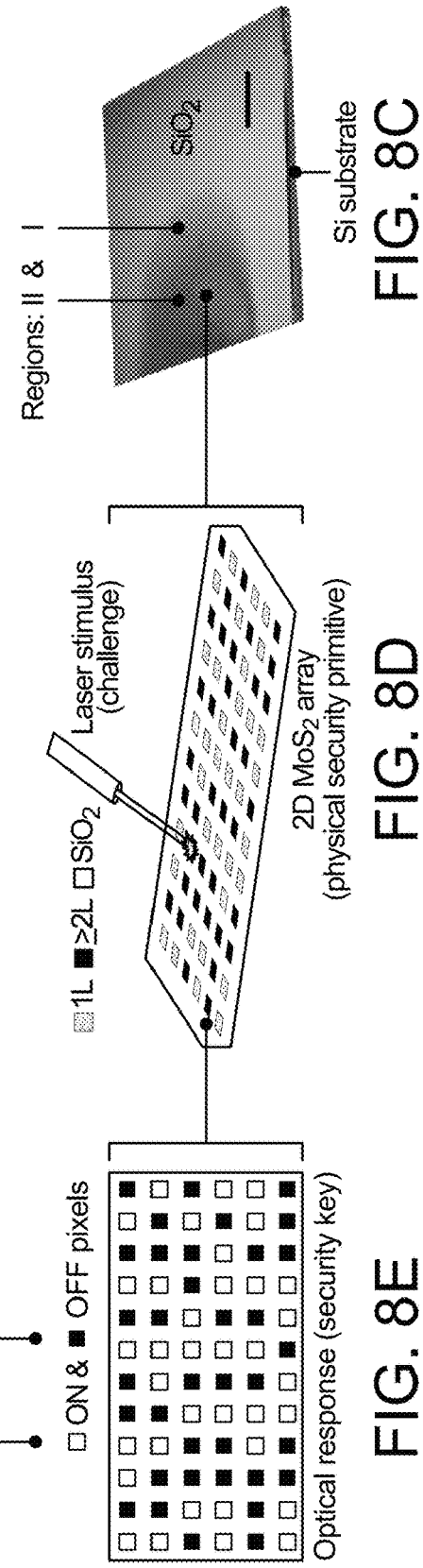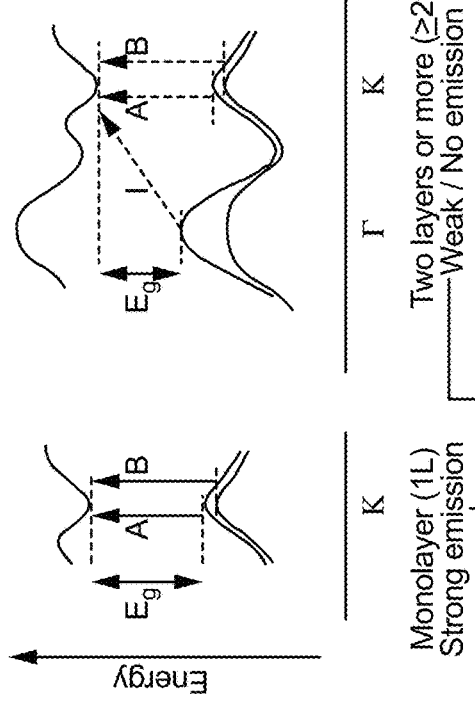
FIG. 8A
FIG. 8B
FIG. 8C
FIG. 8D
FIG. 8E

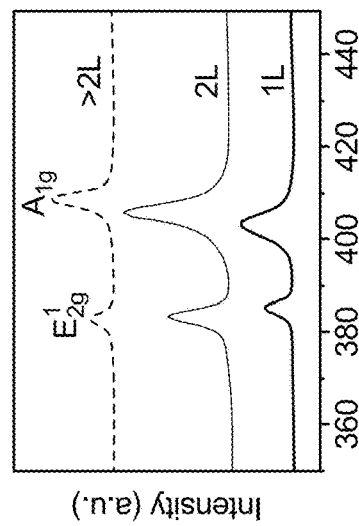
FIG. 11A
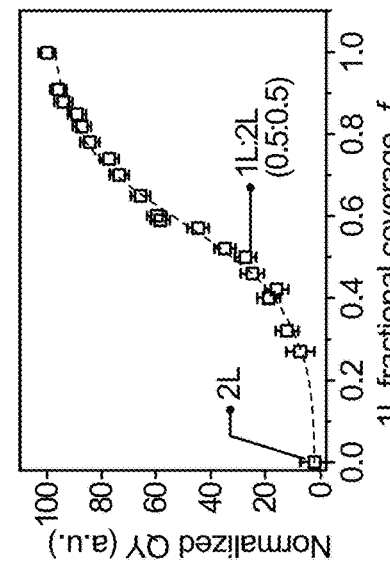
FIG. 11B
FIG. 11C
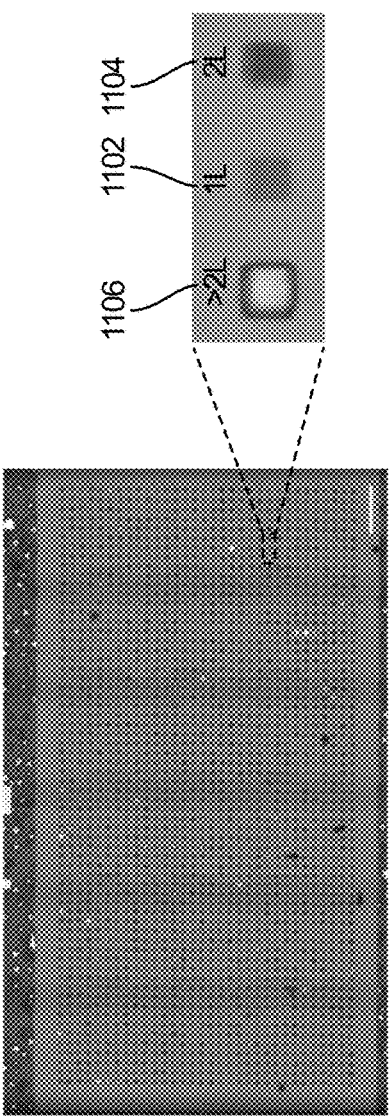
FIG. 11D
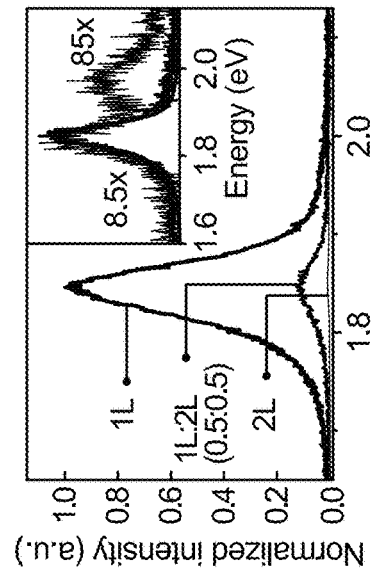
FIG. 11E
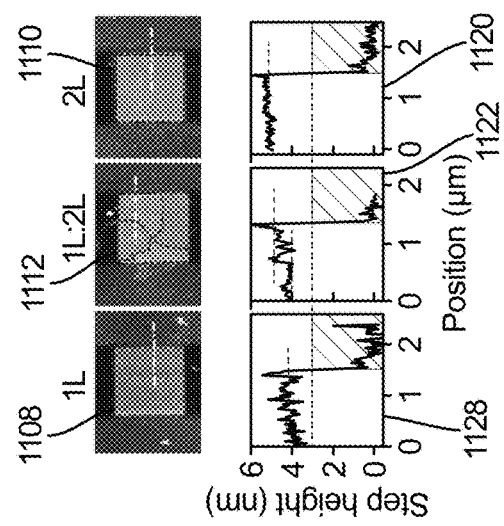
FIG. 11F

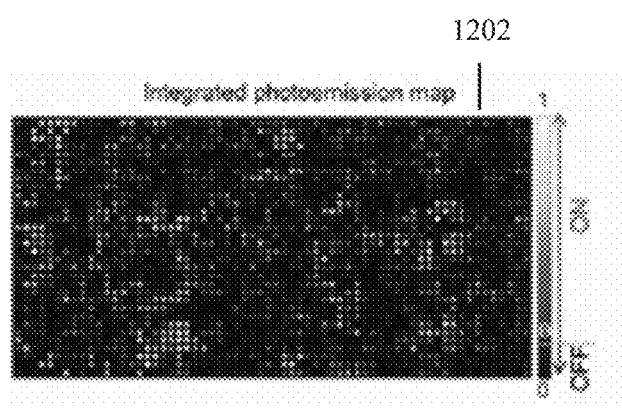
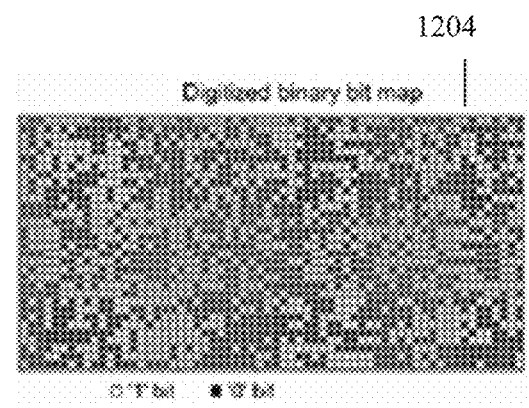
Fig. 12A
Fig. 12B

SYSTEMS AND METHODS FOR OPTICAL PHYSICAL UNCLONABLE PARAMETERS

CROSS-REFERENCE TO RELATED PATENT APPLICATIONS

This application claims priority to U.S. Provisional Patent Application No. 62/436,956, filed Dec. 20, 2016, which is herein incorporated by reference in its entirety.

STATEMENT OF GOVERNMENT INTEREST

The United States Government claims certain rights in this invention pursuant to the terms of the National Science Foundation Award #1638598, U.S. Army Research Office Award #W911NF-16-1-0301, and the U.S. DOE Contract No. DE-SC0012704. This work used the resources of the Center for Functional Nanomaterials, which is a U.S. DOE Office of Science Facility, at Brookhaven National Laboratory.

TECHNICAL FIELD

The present disclosure relates generally to systems and methods for optical physical unclonable primitives, including securing and identifying objects with an optical physical unclonable parameter.

BACKGROUND

In cryptography, a security primitive is a basic interface or function (e.g., segment of code) that uses low-level cryptographic algorithms that may be used to build cryptographic protocols. In security systems generally, primitives can be physical or code-based.

Cryptography, despite millennia of development, continues to adapt to utilize new technology in its endeavor to provide secure communications. One development in cryptography that continues to be researched is physical unclonable functions ("PUFs"). A PUF is a physical structure that cannot be practically duplicated, i.e. is "unclonable". The unclonability is often the result of limitations on manufacturing, either with regard to physical limitations or due to cost.

PUFs have, in particular, been adopted and used in integrated circuits. Such PUFs typically embody a single cryptographic key. The key is extracted by use of a PUF extractor which produces the cryptographic key from the PUF. The PUF is embodied in a physical structure, such as integrated into a silicon wafer. However, there exists a need for a cryptographic technique that presents a truly unclonable physical primitive and method for using such a primitive. Further, there is a need for biocompatible cryptographic structures that provide for an unclonable entity.

SUMMARY

Embodiments described herein relate generally to an article of manufacture that includes or comprises a substrate. In one embodiment, a security primitive is deposited on the substrate, the security primitive comprising transition metal dichalcogenide (TMD) having a varying thickness.

In some embodiments, a method of manufacturing a security primitive is provided. The method comprises providing a substrate; depositing a transition metal dichalcogenide on the substrate forming the security primitive, the deposited transition metal dichalcogenide having a variable thickness, and pixelating the security primitive into a plurality of discrete regions.

In some embodiments, an article of manufacture is provided. The article includes a substrate and a dichalcogenide. The dichalcogenide is deposited on the substrate and has the formula $MX_{(2-a)}Y_a$, where X and Y are two different chalcogen atoms and a is less than or equal to 2 and greater than or equal to 0.

Certain embodiments of the present invention may include some, all, or none of the above advantages. Further advantages may be readily apparent to those skilled in the art from the figures, descriptions, and claims included herein. Aspects and embodiments of the invention are further described in the specification herein below and in the appended claims. It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings. The drawings are for the purpose of illustrative description and no attempt is made to show structural details of an embodiment in more detail than is necessary for a fundamental understanding. For the sake of clarity, some objects depicted in the drawings are not to scale.

FIG. 4B shows a spaced binary processed image of the transition metal dichalcogenide security parameter of FIG. 4A where the pixilation is maintained (i.e. spacing is maintained between pixels); FIG. 4C shows an unspaced binary processed image of the transition metal dichalcogenide security parameter; FIG. 4D shows the Gaussian distribution probability for the uniformity test of the binary processed image of a transition metal dichalcogenide security parameter;

FIG. 4E shows the normal distribution for the uniformity test of the binary processed image of a transition metal dichalcogenide;

FIG. 5A shows Gaussian distribution for the inter-distance between two different arrays of pixels. FIG. 5B shows a normal probability distribution for the inter-distance, according to an example embodiment;

FIG. 6A shows Gaussian distribution for response to the same challenge (stimulus via laser). FIG. 6B shows a normal probability distribution for response to the same challenge, according to an example embodiment;

FIGS. 8A-8E show various aspects of TMD-based physically unclonable security taggants, according to an example embodiment;

FIGS. 11A-11F show aspects of cryptographic key generation using a $MoS_2$ physically unclonable security primitive, according to an example embodiment;

FIGS. 12A-12D show aspects of an optical response and security metrics of an $MoS_2$ primitive, according to an example embodiment;

Figure 1:
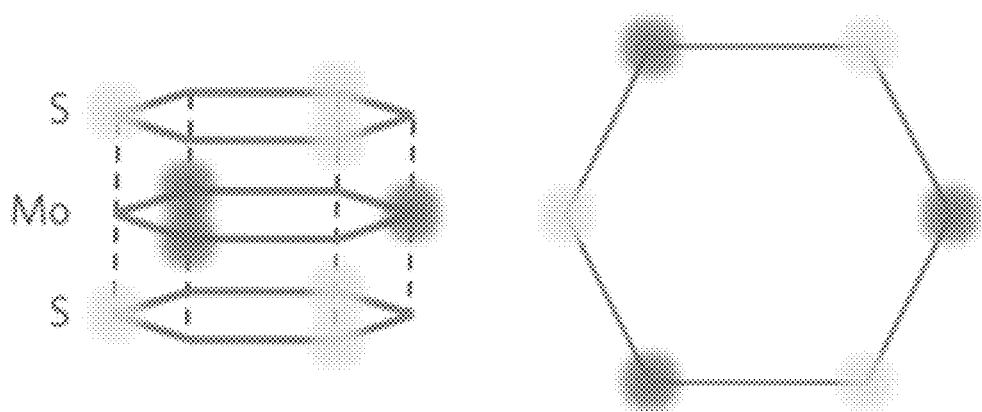
FIG. 1 is an illustration of a structure of a layer of one transition metal dichalcogenide, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for optical physical unclonable primitives. In particular, methods of securing and identifying objects with an optical physical unclonable parameter are disclosed. As will be appreciated, an article of manufacture includes a substrate and a security primitive deposited on the substrate. The security primitive includes a transition metal dichalcogenide having a varying thickness. According to various embodiments, the transition metal dichalcogenide comprises a chalcogen atom (X) selected from the group consisting of S, Se, and Te and a transition metal (M) selected from the group consisting of Mo, W, Hf, and Zr. The security primitive is pixelated into a plurality of discrete regions having different luminescence. A security primitive key includes a first set of data values corresponding to a first set of coordinates of a first region and a second set of data values corresponding to a second set of coordinates of a second region. In some embodiments, the security primitive key is digitally captured through an optical reader and verified by querying a database.

The systems and methods disclosed herein bring about technical advantages and contribute to fields of 2D materials and hardware security in a variety of ways. First, the present disclosure advances the field of large-area TMD synthesis with the new understanding of the growth kinetics. Second, the present disclosure describes a new class of security taggants that make use of two fundamental material properties of TMDs, namely the strong dependence of photo-emission in TMDs on thickness of the TMD-based device (such as a number of TMD layers used) and complete spatial randomness through island growth during, for example, manufacture of TMDs using chemical vapor disposition (CVD). Third, the systems and methods disclosed herein take advantage of the fundamentals underlying the principles of TMD growth to develop security metrics and methods implemented in TMD-based security taggants. Fourth, the systems and methods disclosed herein leverage physical transience of certain TMDs and in building "vanishing" security primitives, which can undergo physical transience and disappear by design in a specific target environment. As described further herein, these systems and methods contribute to a new class of security taggant technology based on TMDs. This security taggants technology has a wide-ranging applications in, for example, pharmaceutical supply chains, food supply chains, and the Internet-of-Things (IoT). Since the photo-emission of TMDs occurs in the visible range of the spectrum, the TMD-based security taggants can be authenticated using state-of-the-art cameras in mobile devices, such as smartphones, tablets, etc.

In one embodiment, a security parameter comprises a transition metal dichalcogenide deposited as a film with variable thickness. The transition metal dichalcogenides may be of the type represented by $MX_2$, where X is a chalcogen atom (such as, but not limited to S, Se, and/or Te) and M is a transition metal, such as, but not limited to, Mo, W, Hf, and/or Zr. In some embodiments, the film be mixed, or doped. For example, one could consider $MX_{(2-a)}Y_a$, where X and Y are two different chalcogen atoms and "a" is less than 2 and greater than 0. The transition metal dichalcogenides may be further treated to enhance photoluminescence such as by chemical treatment (e.g., superacid treatment) or using plasmonic arrays.

A substrate is provided for receiving and supporting the transition metal dichalcogenide security primitives. In one embodiment, the transition metal dichalcogenide security primitive can be deposited on a wide variety of substrates, including silicon, biomaterials, plastics, organic products such as paper, or hybrid or multi-component materials. In one embodiment, the substrate has an amorphous structure.

The amorphous structure contributes to the randomness of the layer thickness due to the impact on the nucleation sites for CVD.

In one embodiment, the security parameter of a security primitive including TMD is deposited on the substrate. In one particular embodiment, the transition metal dichalcogenide security primitive is deposited on a surface by CVD, such as described in Aiharbi, Abdullah, and Davood Shahrjerdi, "Electronic properties of monolayer tungsten disulfide grown by chemical vapor deposition." *Applied Physics Letters* (2016), incorporated herein by reference. The transition metal dichalcogenide security primitive may be deposited with a thickness of monolayer to a few atomic layers (e.g., 2 to 200 layers) In some embodiments, the layer may not be of uniform thickness and may have holes and/or areas without transition metal dichalcogenide.

I. Overview

FIG. 1 is an illustration of the structure of a layer of one transition metal dichalcogenide, according to an example embodiment. The transition metal dichalcogenide security primitive has a physical structure of X, then a layer of M, and then a layer of X to comprise a single layer to form $MX_2$. For example, the transition metal dichalcogenide security primitive may have a hexagonal lattice structure, such as that shown in FIG. 1.

The security parameter of a security primitive including TMD has an area of at least 100 $um^2$, for example 100 $um^2$ to 1000 $um^2$.

The security parameter of a security primitive including TMD may be physically segmented or pixelated to provide for discrete regions on the security parameter. Each segment may have a single uniform thickness, but more likely will exhibit a varying thickness. In one embodiment, each region may be considered to have a state corresponding to the exhibited luminescence. For example, the state may be binary, considered either to be luminescent or not, or may be a value or range of values selected from a spectrum of various levels of luminescence. The physical pixilation may be accomplished by use of traditional lithographic techniques, such as e-beam, photo lithography, and/or masking.

Image processing can be used after a challenge is applied to the security parameter and a response recorded. The image processing can be used to pixelate the security parameter of a security primitive including TMD via software rather than relying on a physical pixilation. This may reduce upfront manufacturing costs.

Figure 2:
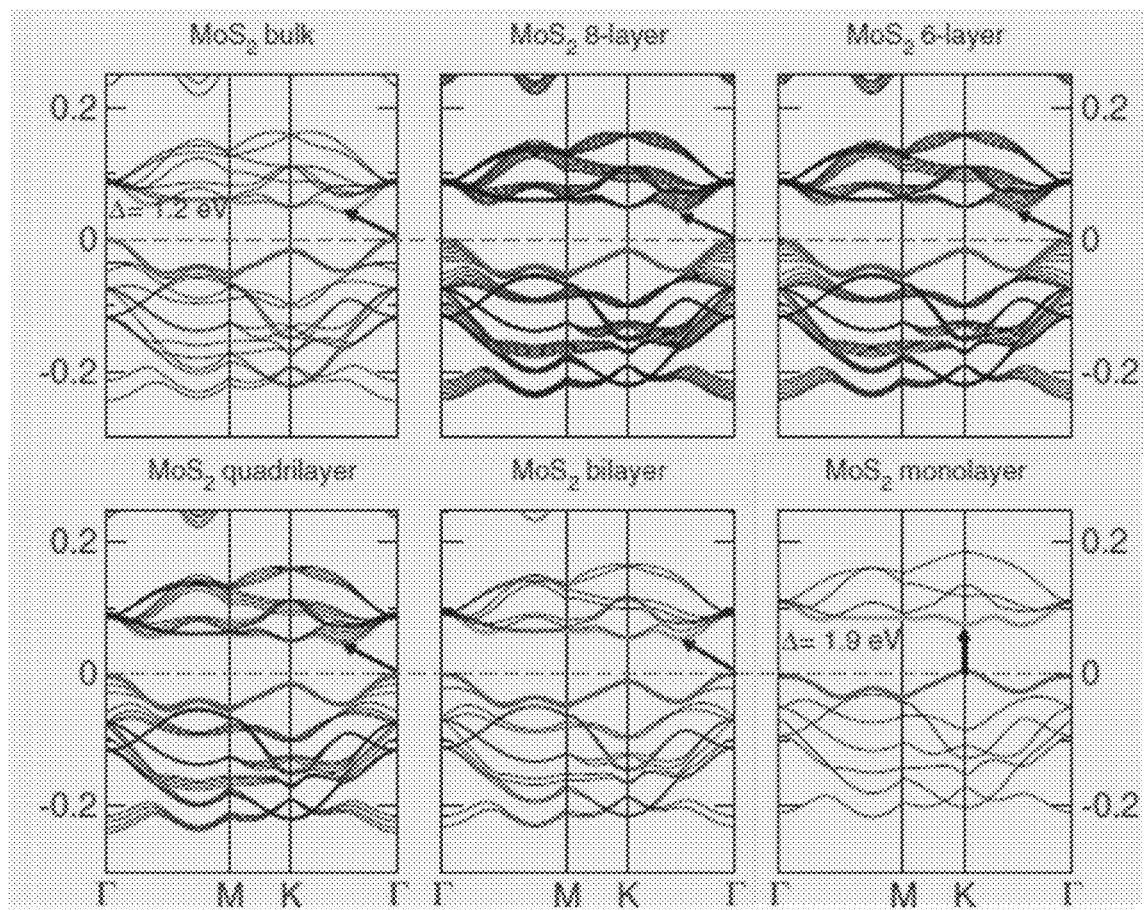
FIG. 2 illustrates a series of graphs of energy band structures for $MoS_2$ at varying thicknesses (such as bulk, 8-layer, 6-layer, 4-layer, 2-layer, and monolayer), according to an example embodiment.

FIG. 2 shows the band gap for $MoS_2$, where bulk, 8, 6, 4, and 2 layer each exhibit indirect band gaps. In contrast, the monolayer sample of FIG. 2 shows a direct band gap. The transition metal dichalcogenide exhibits a change in energy band structure when the transition metal dichalcogenide is a monolayer compared to bilayer or greater.

A light source interact with the security parameter of a security primitive including TMD when the security parameter is queried for a challenge. In one embodiment, a laser is directed to the security parameter of a security primitive including TMD. The response to the challenge is, preferably, recorded for processing and/or comparison to verify the security parameter of a security primitive including TMD. An imaging system may be provided for capturing the response of the transition metal dichalcogenide security primitive to the challenge, such as the luminescence or other response from the transition metal dichalcogenide security primitive upon application of the challenge. For example, one may query the Raman peak resonance of the layers as additional information for distinguishing the pixels composed of transition metal dichalcogenides with varying thickness. In one embodiment, a database (or databases) is queried to verify the security primitive.

The difference in band gap and the behavior of the transition metal dichalcogenide security primitive within each region provides a unique combination of regions that each provides a response to the challenge, for example either luminescing or not in response to a laser.

The difference in band gap between layer thicknesses can be harnessed to determine the thickness of a respective location on the security primitive. The stoichiometric nature of the deposition of the transition metal dichalcogenide security primitive, such as by CVD, provides a substantially unique arrangement of layer thickness, as described further herein. This results in a substantially unique fingerprint or encoded information that can be read based on the luminescence associated with each security primitive.

Importantly, each security parameter of a security primitive is unclonable, as the particular fingerprint created by the chemical reactions that form one security parameter of a security primitive cannot be recreated to form an identical parameter. The randomness of the layer thickness across the specimen stems from the random nucleation of the seed layer on the surface of the specimen.

Figure 3:
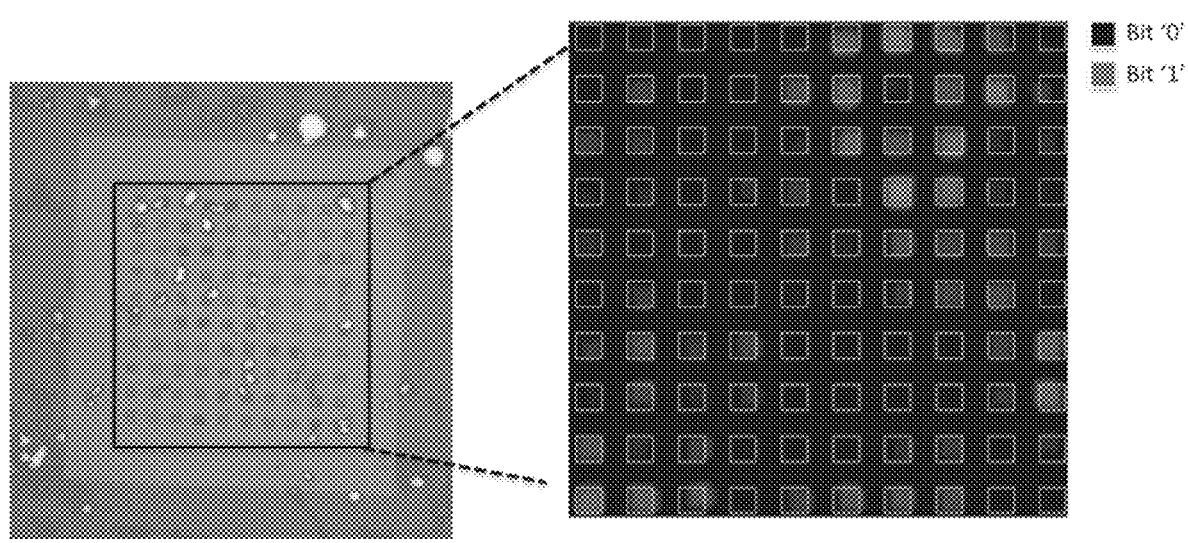
FIG. 3 is an optical image of a security parameter (e.g., array of pixels, region, area, segment, etc.) of a security primitive including TMD that has been pixelated, according to an example embodiment.

FIG. 3 shows a sample $MoS_2$ security parameter of a security primitive including TMD with a pixilation grid applied. The outset figure shows the results of a luminescence exhibited by the sample under green laser excitation at 100 µW.

Figure 4A:
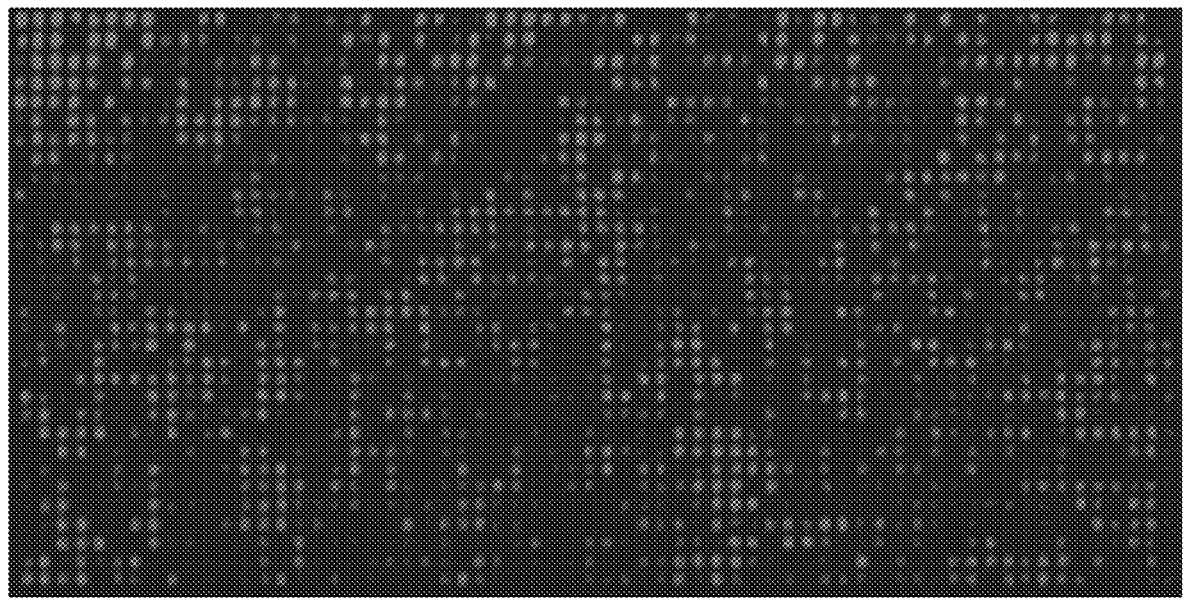
FIGS. 4A-4E show aspects of a security parameter luminescence of a transition metal dichalcogenide.
Figure 4B:
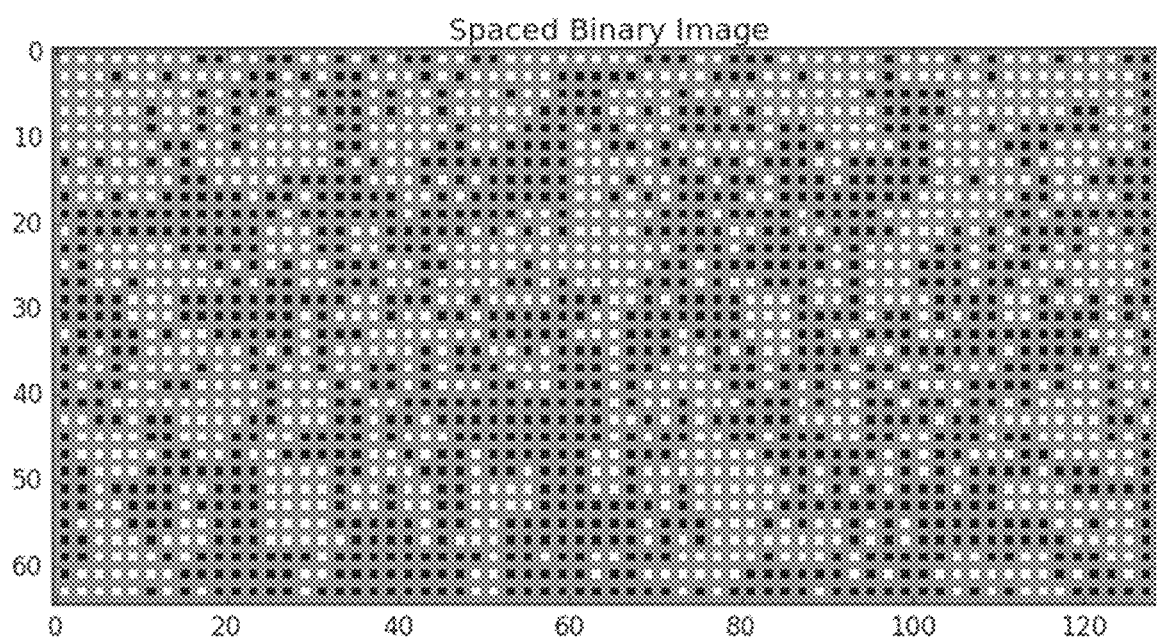
Figure 4C:
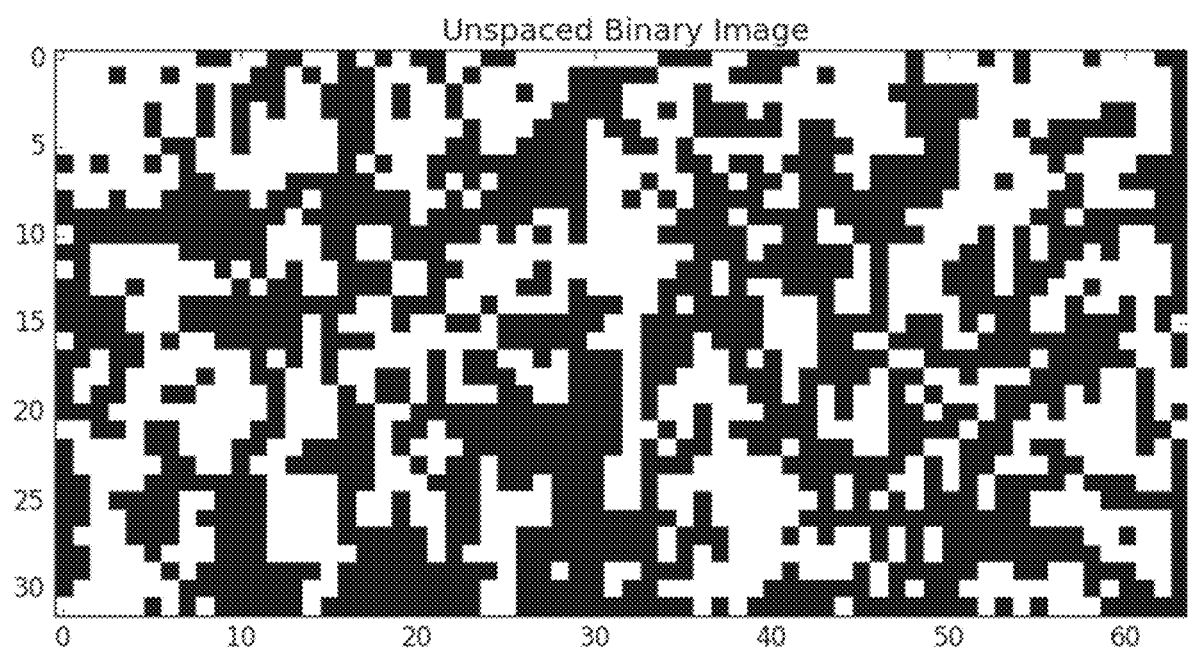
Figure 4D:
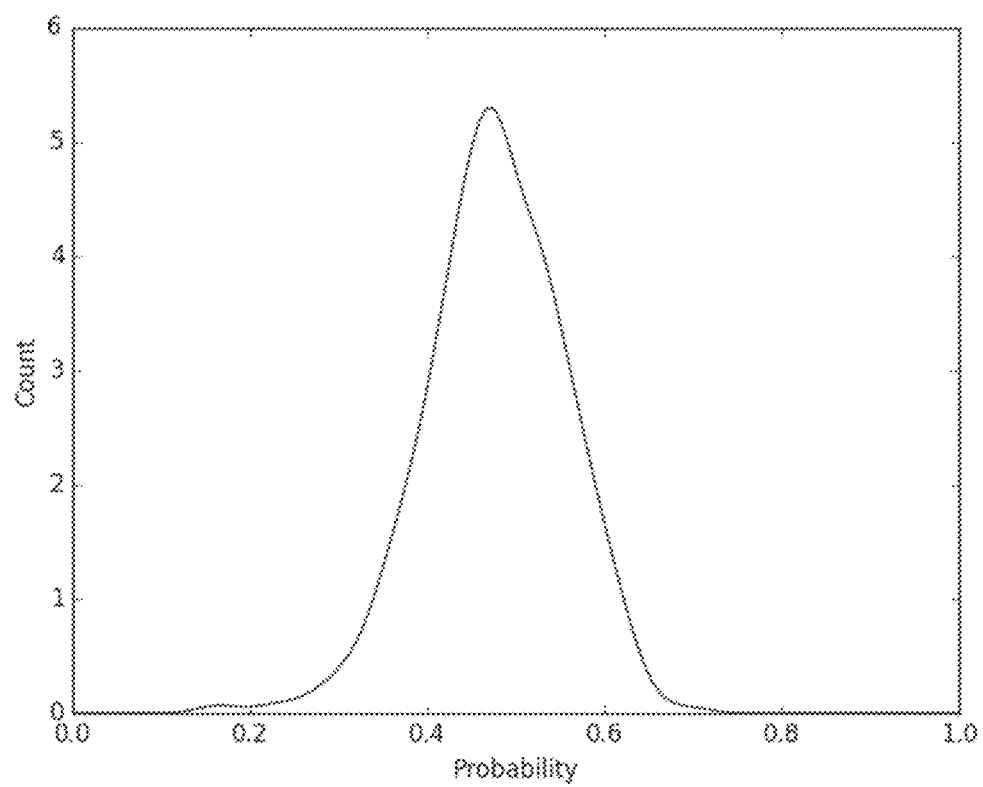
Figure 4E:
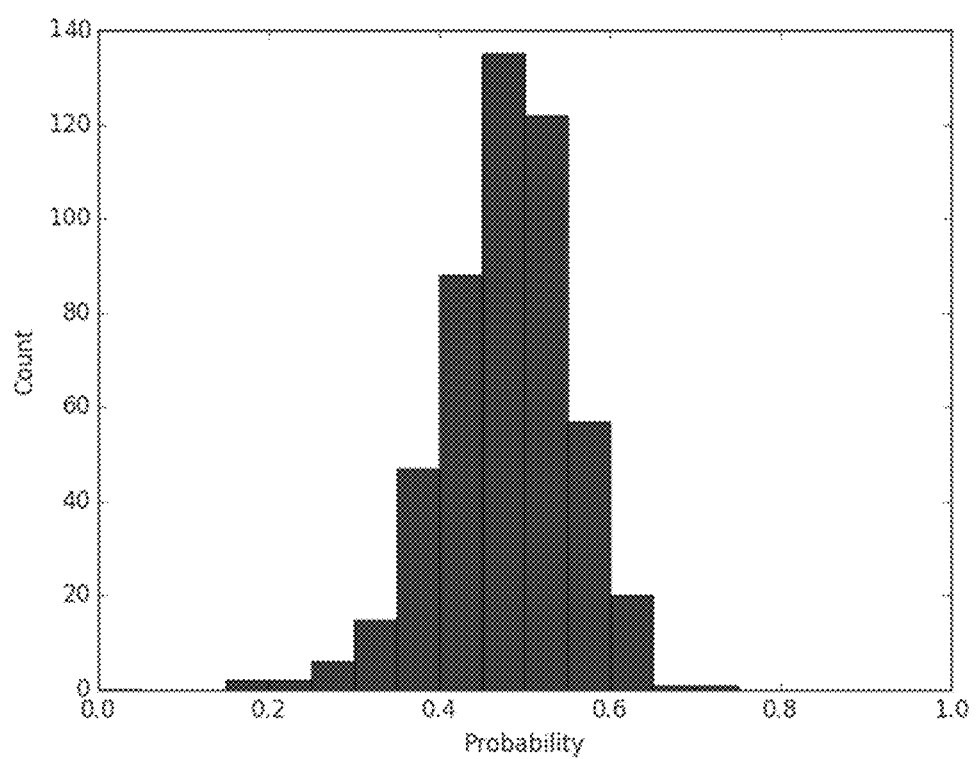

FIG. 4A shows a security parameter luminescence of a transition metal dichalcogenide. FIG. 4B shows a spaced binary processed image of the security parameter of FIG. 4A where the pixilation is maintained (i.e. spacing is maintained between pixels). FIG. 4C shows an unspaced binary processed image of the security parameter of FIG. 4A. FIG. 4D shows the Gaussian distribution probability for the uniformity test of the binary processed image of the security parameter of FIG. 4A. FIG. 4E shows the normal distribution for the uniformity test of the binary processed image of a security parameter.

Figure 5A:
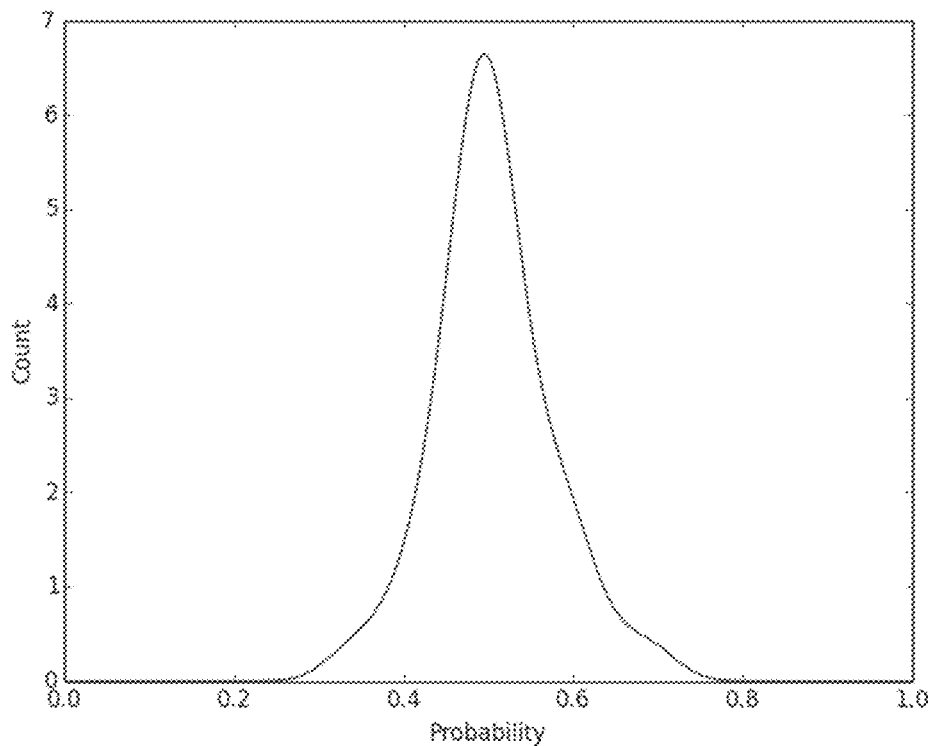
FIGS. 5A and 5B illustrate the results of a uniqueness test for a security parameter of a security primitive including TMD.
Figure 5B:
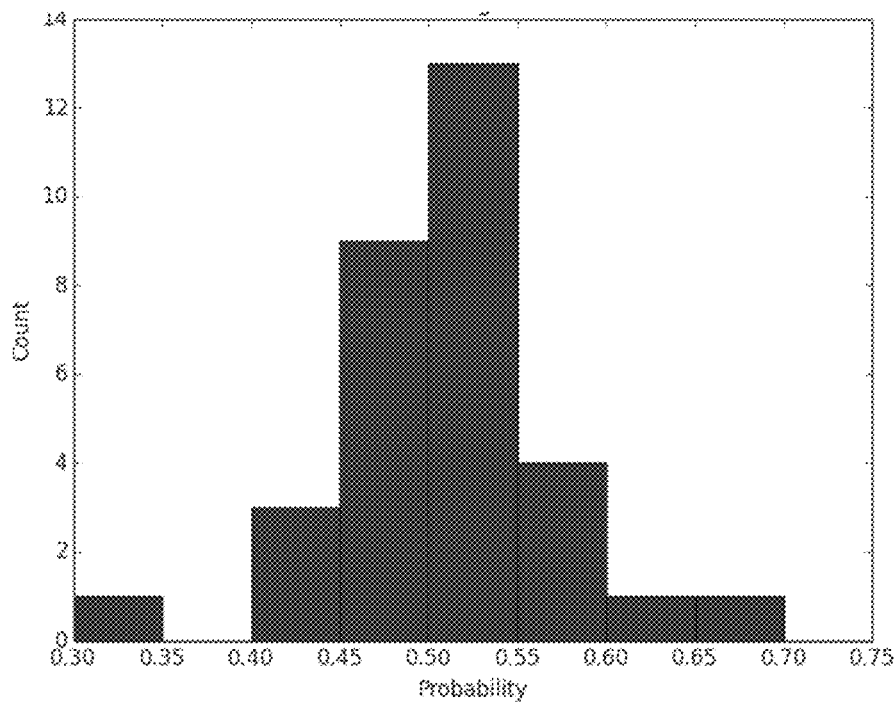

FIGS. 5A and 5B illustrate the inter-distance between two responsive different arrays of pixels as an indicator of uniqueness. Further information on the uniqueness testing is shown in Table 1. The array was excited using a green laser at 100 µW. The test results indicate an inter-distance of ~50%, indicative of a different nature of the arrangement of 0 ad 1 bits within the two arrays.

TABLE 1

| | Inter-Distance | | |
|---|---|---|---|
| | Uniqueness | Variance | Standard Deviation |
| Array 1 | 0.50048828125 | 0.00496649742126 | 0.0704733809411 |

Figure 6A:
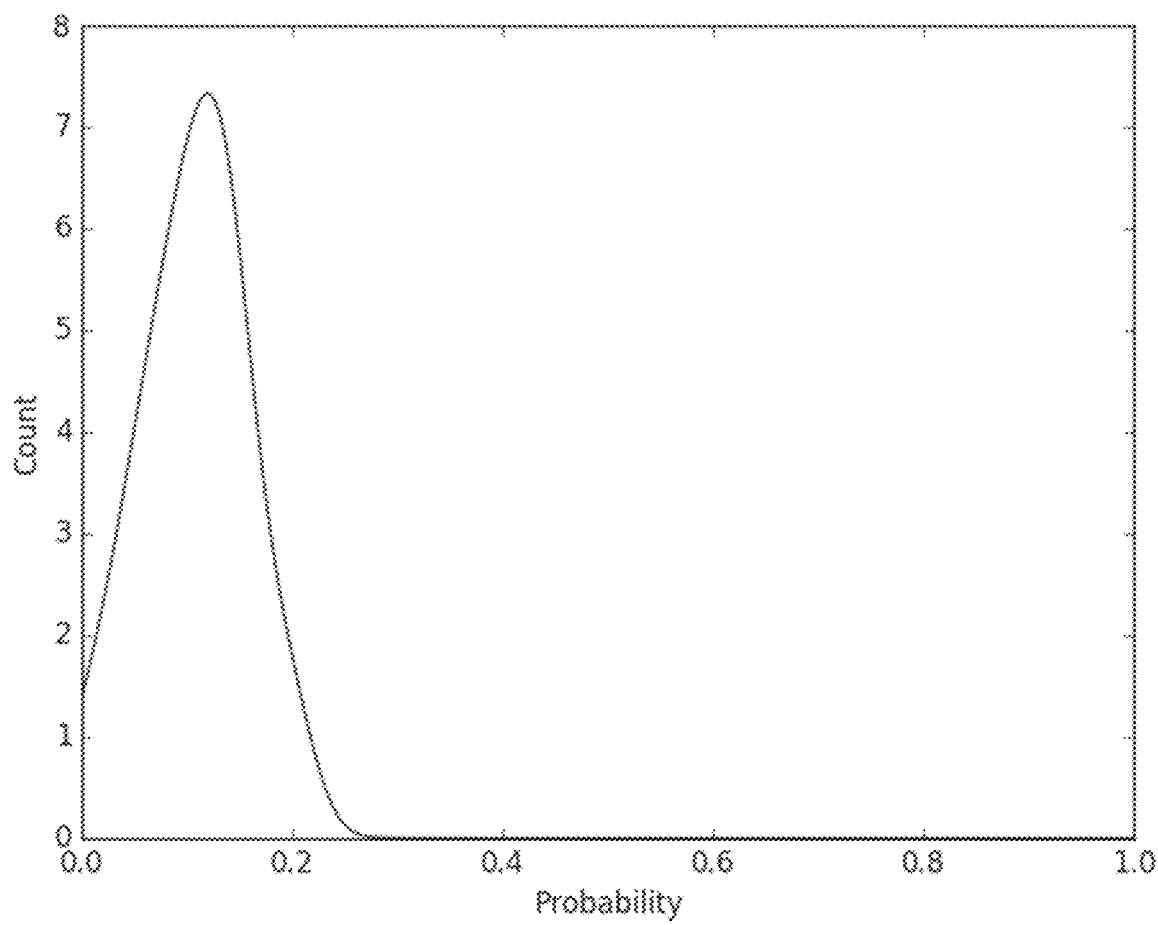
FIGS. 6A and 6B illustrate reliability for a security parameter of a security primitive including TMD.
Figure 6B:
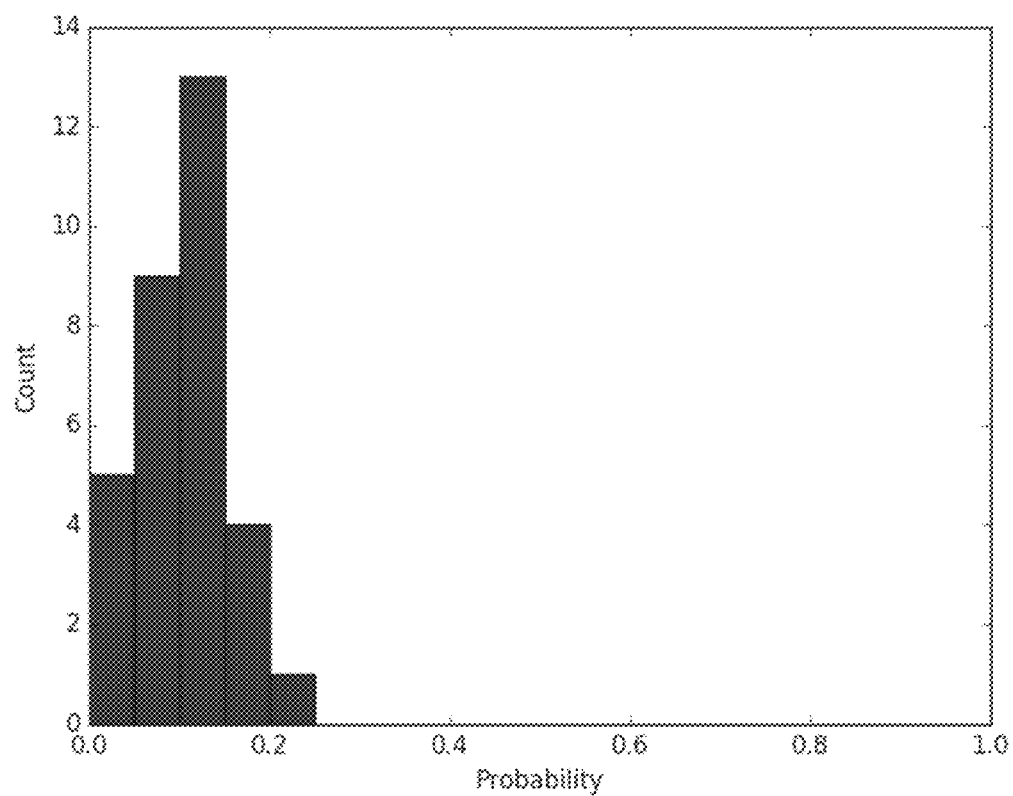

FIGS. 6A and 6B illustrate a response of a pixel to successive applications of the same challenge as an indicator of reliability. Further information on the uniqueness testing is shown in Table 2.

TABLE 2

| | | Mean | Variance | Standard Deviation |
|---|---|---|---|---|
| Array 1 | Area | 0.1064453125 | 0.0023717880249 | 0.0487010064054 |

In some embodiments, the uniformity of the transition metal dichalcogenide security primitive is at least 50%. In some embodiments, the uniqueness of the transition metal dichalcogenide security primitive is at least 50%.

The security parameter of a security primitive including TMD may be used as a unique identifier for drugs, currency, official documents, electronic circuits, high-end goods such as jewelry, watches, and designer handbags, wearable devices.

II. Computer-Implemented Aspects

Figure 7:
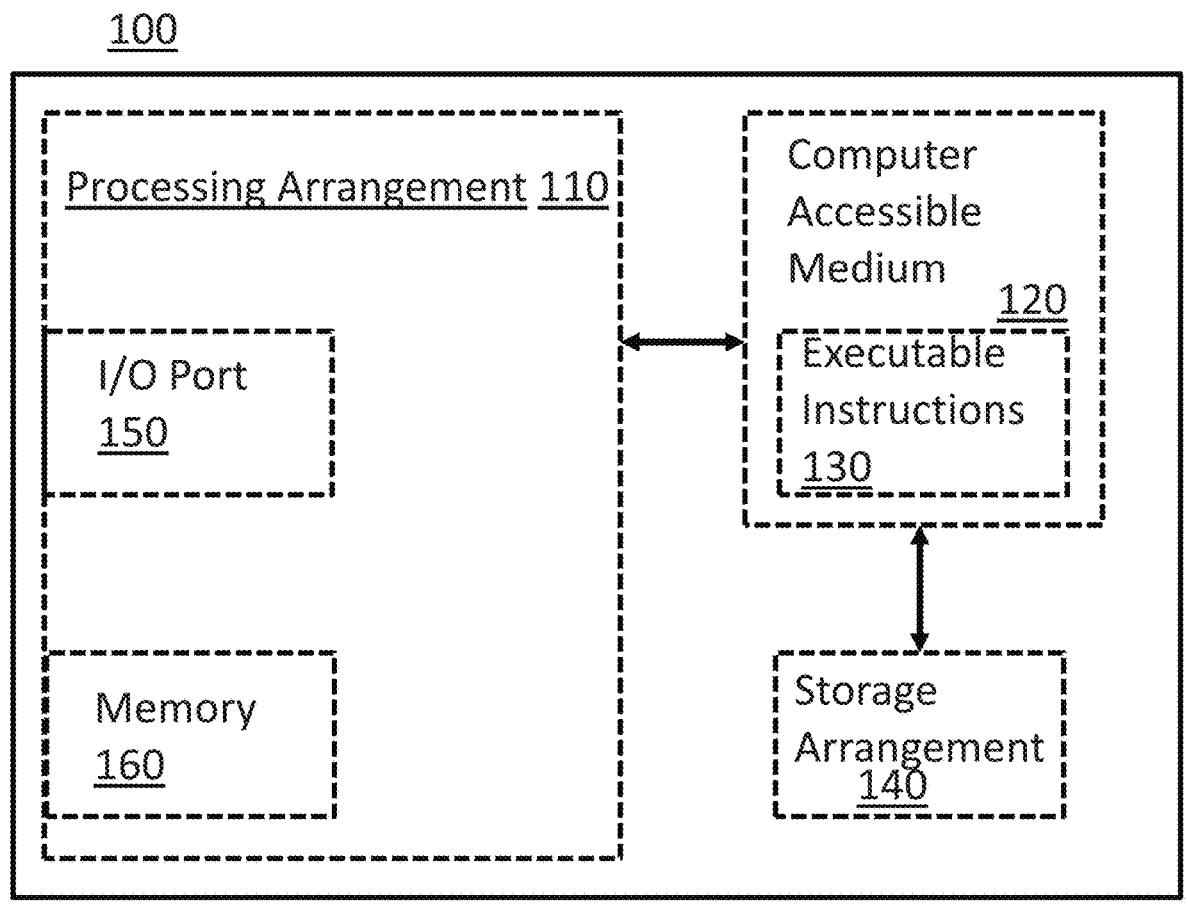
FIG. 7 schematically depicts a computer system for use with certain implementations, according to an example embodiment.

FIG. 7 schematically depicts a computer system for use with certain implementations, according to an example embodiment. As shown in FIG. 7, e.g., a computer-accessible medium 120 (e.g., as described herein, a storage device such as a hard disk, floppy disk, memory stick, CD-ROM, RAM, ROM, etc., and/or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example. The instructions may include a plurality of sets of instructions.

System 100 may also include a display or output device, an input device such as a keyboard, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

III. TMD-Based Physically Unclonable Security Taggants

FIGS. 8A-8E show various aspects of TMD-based physically unclonable security taggants, according to an example embodiment. A security taggant is a physical object that produces a unique response upon stimulation by an electrical or optical challenge. Here, security taggants were constructed from $MoS_2$ and/or $WS_2$. The fundamental properties of the TMD growth process are discussed further herein. Films with suitable structure and randomness for realizing the security taggants were produced. The randomness of the growth its effect on the security metrics of the TMD-based taggants were statistically tested. A nanofabrication platform to build TMD-based security taggants from these films was used.

An ideal island growth, where the resulting film is non-continuous, was expected to demonstrate complete spatial randomness (CSR). In CSR, all nucleations are independent, and the probability of nucleation is the uniform over the entire surface. These properties signify a spatial Poisson process. As shown, the TMD growth can be tuned to achieve CSR. The natural randomness of the TMD island growth can hence offer a close approximation of true randomness without resorting to quantum uncertainties. Security taggants that leverage this TMD material property are therefore unclonable, stable, and secure.

FIG. 8A shows the energy band structure of monolayer and multilayer $MoS_2$, indicating strong dependence of excitonic emission on the number of $MoS_2$ layers.

FIG. 8B shows a method of using solid-phase precursors for synthesis of large-area $MoS_2$ films. A large-area $MoS_2$ film was produced using a chemical vapor deposition (CVD) process in a layer-plus-island growth mode. CVD has a low production cost and scales to large-area films on par with advanced silicon manufacturing. CVD techniques have shown good thickness control on a large scale.

FIG. 8C shows a CVD $MoS_2$ sample indicating two distinct regions of growth, namely, region I and region 2, as shown. The scale bar is 5 mm. The region of interest (i.e. region II) is composed of a continuous $MoS_2$ monolayer with speckles of multilayer (two layers or more) islands. The growth process was engineered to achieve an optimal island density in this region that aimed to yield an equal probability of random zero and one bits. CSR of the multilayer islands was confirmed using a statistical test by Clark-Evans. By confirming CSR, the Avrami equation was used to draw insight into the kinetics of the island growth in region II. It was observed that two distinct regions of growth along the substrate resulted because the growth depends on the distance of the substrate from the source of $MoO_3$ powder. In this example, Region I was the farthest (1 cm) from the source of $MoO_3$ powder in the reactor, where the optimal growth conditions yielded a continuous monolayer. On the other hand, Region II, closer to the source of $MoO_3$ powder (<6 mm), was covered by a continuous monolayer film with randomly distributed multilayer islands.

FIG. 8D shows an array of 32×64 pixels, which was formed in region II. The security primitive of the example embodiment is fabricated as a 2048-pixel array from the film in this region.

FIG. 8E shows that stimulating the physical $MoS_2$ primitive with a laser light produces a substantially unique optical response with randomly distributed ON and OFF pixels. As shown, monolayer configurations produce strong emissions, indicating an ON state, and multiplayer configurations produce comparatively weaker emissions, indicating an OFF state. The intensity of emission by the monolayer (strong emission) is at least an order of magnitude higher than the multilayer (weak emission). Applying an optical (e.g., laser) stimulus to the security primitive resulted in random ON and OFF pixels, owing to the spatial randomness of the multilayer speckles and the different photoemission strengths of monolayer and multilayer pixels. Using standard security tests, the randomness and stability of the security keys generated from the proposed security primitive were confirmed.

IV. Engineering Growth Randomness

Figure 9A:
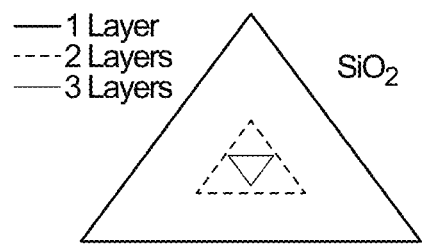
FIGS. 9A and 9B show a contrast in the photo-emission response of monolayer and multilayer TMD films, according to an example embodiment.
Figure 9B:
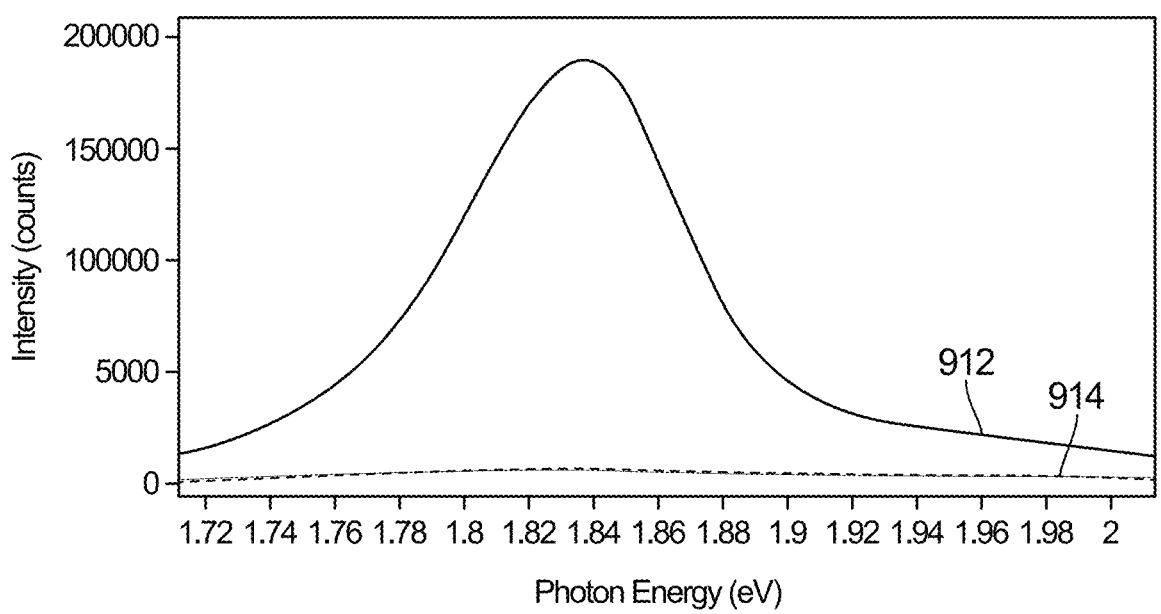

FIGS. 9A and 9B show a contrast in the photo-emission response of monolayer and multilayer TMD films, according to an example embodiment. The photo-emission properties of a $WS_2$ film are shown as a function of the number of atomic layers. This illustrates the strong dependence of the photo-emission on the thickness of the film.

FIG. 9A shows an optical image of a $WS_2$ flake with concentric single crystal grains. The dashed lines identify the number of layers.

FIG. 9B shows a plot of the photoemission properties of the WS2 film (on the x-axis) as a function of its number of layers (on the y-axis), illustrating a marked difference in the photoemission of one-layer film, shown at 912, and a multi-layer film, shown at 914.

FIGS. 10A-10D show growth patterns in various regions of a TMD film that includes $MoO_3$, according to an example embodiment. All scale bars are 30 µm. Large-area $MoS_2$ films were grown onto 285 nm $SiO_2$ on p+ silicon substrates by CVD using sulfur and $MoO_3$ precursors. Growth randomness (CSR) was tested. According to various embodiments, various parameters of CVD or another suitable manufacturing process can be tuned to influence the growth dynamics, including the temperature profile of the precursors, carrier gas flow, growth time, and quantity of precursors.

Figure 10A:
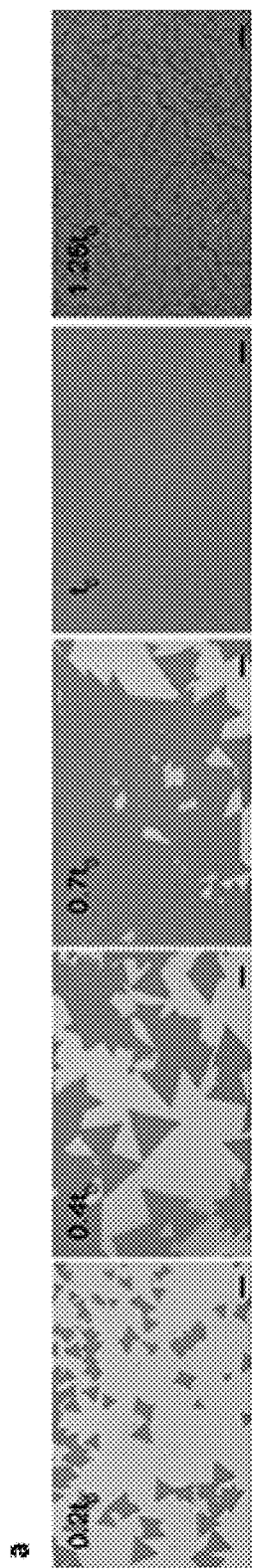
FIGS. 10A-10D show growth patterns in various regions of a TMD film that includes $MoO_3$, according to an example embodiment.

FIG. 10A shows optical images 1010, 1020, 1030, 1040, and 1050 that collectively illustrate the time evolution of the $MoS_2$ growth in region I, discussed with respect to FIG. 8C-D. The layer-by-layer growth occurred in the region I with low Mo vapor pressure and the growth follows a site-saturated growth kinetics.

Figure 10B:
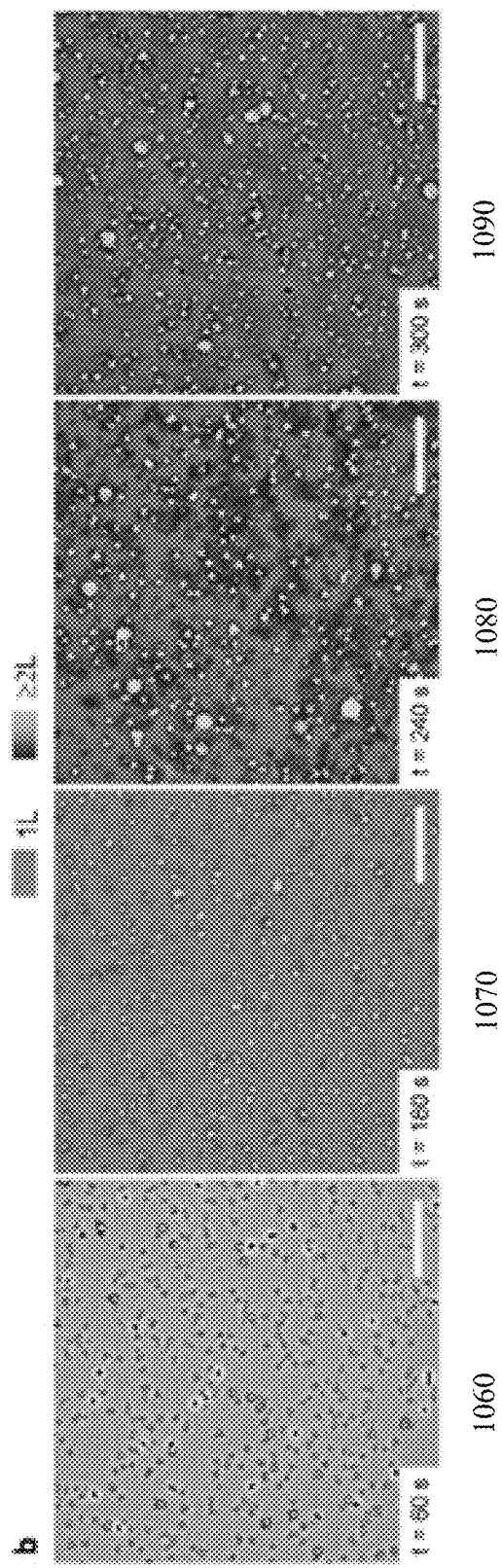

FIG. 10B shows optical images 1060, 1070, 1080, and 1090 that collectively illustrate the time evolution of the $MoS_2$ growth in region II, discussed with respect to FIG. 8C-D, indicating the layer-plus-island growth modes. In contrast to FIG. 10A, region II (that is closer to the $MoO_3$ powder) was exposed to a higher concentration of Mo vapor, resulting in the layer-plus-island growth mode. To produce the physically unclonable security primitive, the growth process was engineered in region II to achieve an optimal surface coverage of the multilayer islands.

Complete spatial randomness helps construct strong cryptographic keys in our proposed concept. To test for CSR of the island growth in region II, the statistical test by Clark and Evans was applied on images from this region, taken at an early stage of the multilayer nucleation on the continuous monolayer film. If the island growth is CSR, then the distribution of nearest neighbor distances (i.e. the distances between the islands and their nearest neighbor) has a mean $rCSR=1/(2\sqrt{\rho})$ and a variance $\sigma\_CSR^2=(4-\pi)/(4\pi\rho)$, where $\rho$ is the particle density per unit area. Therefore, we could test for CSR by testing the null hypothesis that the mean of nearest neighbor distances is equal to rCSR. Using the two-tailed test for the population mean, we computed the standard Z-score given by:

$$Z = \frac{\langle r_S \rangle - \langle r_{CSR} \rangle}{\sqrt{\sigma_{CSR}^2/N}}, \quad (1)$$

where $r_s$ is the sample mean of the nearest neighbor distances computed with N particles. That is, $$r_S = \sum_{i=1}^{N} \frac{r_i}{N}, \quad (2)$$

where $r_i$ is the nearest neighbor distance of the $i^{th}$ island. At a 0.05 significance level, the null hypothesis is to be rejected if $Z \leq -1.96$ or $Z \geq 1.96$. We calculated typical Z values of about 0.7-1.0 for the samples. Hence, at the 0.05-level of significance, it was confirmed that the mean nearest neighbor distance is rCSR. This suggests that the island growth in region II exhibits CSR, hence all nucleations are independent and the probability of nucleation is the same everywhere on the surface.

Considering CSR island growth in region II, the Avrami equation can be used to draw insight into the time evolution of the island growth. For a growth time t, the fractional surface coverage f of the multilayer islands (≥2L, having two or more layers) is approximated by:

$$f_{\geq 2L}(t) = 1 - e^{-kt^n} \quad (3)$$

where the Avrami exponent n gives information about the kinetics of the island growth. To analyze the growth kinetics, we prepared several samples strictly by varying the growth times while keeping the other processing conditions identical—including the quantity of the precursors, the sample size, and the sample position relative to $MoO_3$. In this example, the quantities of $MoO_3$ and sulfur powders were 6 mg and 100 mg, respectively. We then imaged the samples to compute the fractional areal coverage of monolayer and multilayer films in region II. Assuming time-invariant growth kinetics, this experiment provided a good approximation of the time evolution of the surface coverage. From the optical images, we made two key determinations. First, the nucleation is continuous as evident from the concurrent presence of thin (mostly bilayer) and thick islands in all different stages of the growth. Second, the growth is mostly 2D, i.e. the lateral dimensions of islands grow faster than the thickness.

Figure 10C:
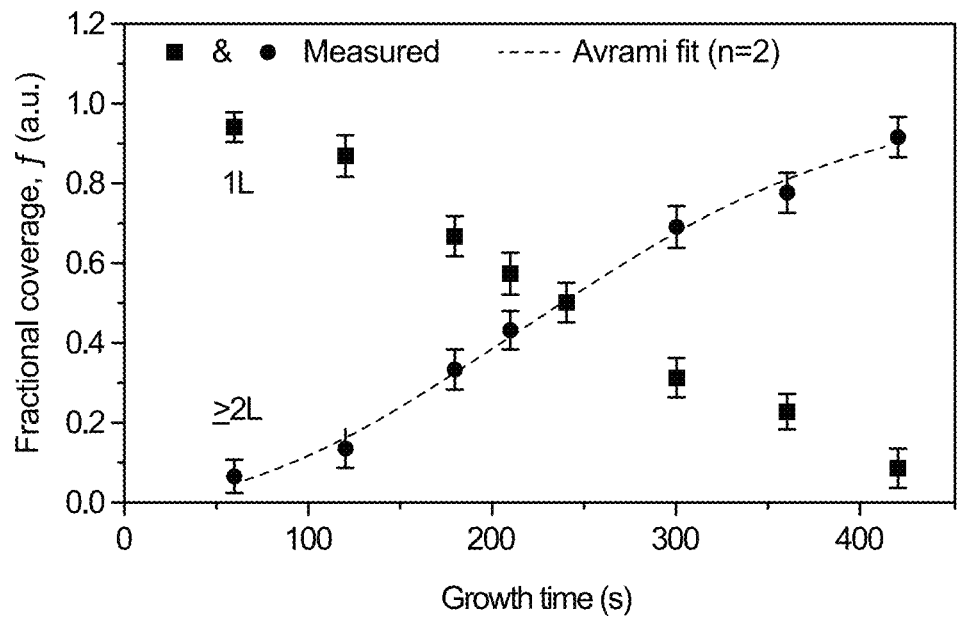

FIG. 10C summarizes the time evolution of the fractional surface coverage for the monolayer film and the multilayer islands. In this plot, t=0 represents the time at which a monolayer fully covers the surface in region II. This time corresponds to the beginning of the growth cycle at 850° C. From the data, the multilayer islands cover 50% of the monolayer film surface at t≈240 s.

Figure 10D:
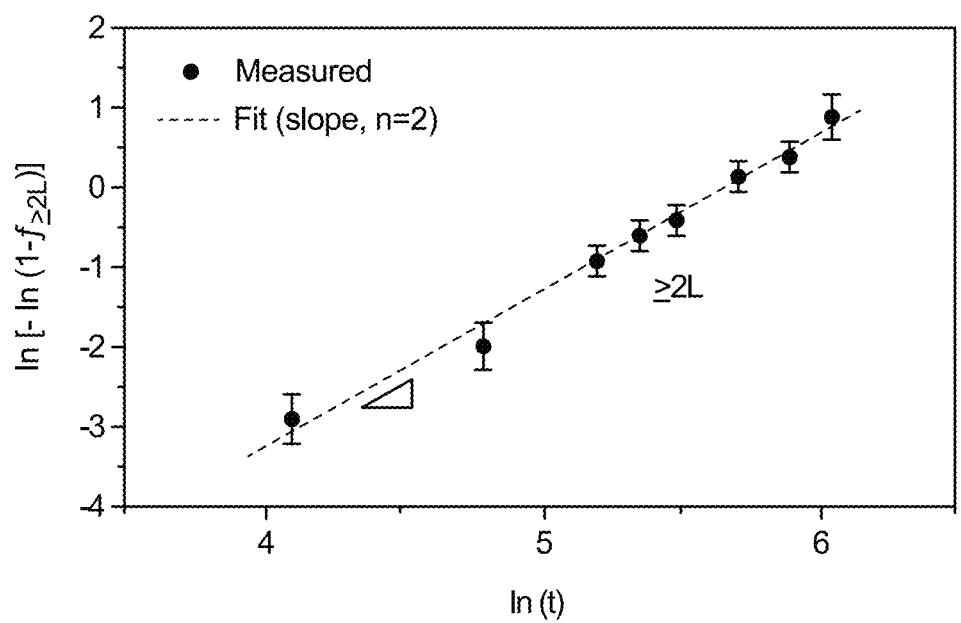

As shown in FIG. 10D, we plotted $\ln[-\ln(1-f_{\geq 2L})]$ as a function of ln(t), where the slope of the fitted line gives the estimate for the Avrami exponent n. We found that n≈2, suggesting a 2D disk-shaped growth governed by the surface diffusion Equation 3 provides a reasonable fit to the data, further confirming CSR of the multilayer island growth in region II.

After analyzing the growth kinetics, we adjusted the growth time to obtain $MoS_2$ films with equal surface areas of exposed monolayer (1L) film and of the multilayer islands, i.e. f1L=f≥2L=0.5. This was done to achieve the maximum combination randomness in the security key responses.

V. Cryptographic Key Generation

FIGS. 11A-11F show aspects cryptographic key generation using a $MoS_2$ physically unclonable security primitive, according to an example embodiment. To implement the $MoS_2$-based security primitives, we fabricated dense arrays consisting of 32×64 pixels from the film in region II, discussed with respect to FIGS. 8C-D. These arrays have a pixel size of 2 µm×2 µm and an equal pixel spacing of 2 µm. This pixel size was chosen because it is comparable with the dimensions of a currently state-of-the-art CMOS image sensor.

FIG. 11A is an optical image of a 2D array with 2048 $MoS_2$ pixels, the array fabricated on a $SiO_2$/Si substrate. Due to the randomness of the multilayer island growth on a continuous monolayer film, the content of each pixel is random. Specifically, a pixel might consist of a monolayer, a multilayer, or a mixture of the two.

FIG. 11B is a zoomed-in optical image of three neighboring $MoS_2$ pixels with different layer thickness: monolayer 1102, bilayer 1104, and multilayer (more than two layers) 1106. These pixels visually look different from one another, indicating their thickness difference.

FIG. 11C shows the corresponding Raman spectra of the monolayer 1102, bilayer 1104, and multilayer (more than two layers) 1106 pixels shown in FIG. 11B. The Raman fingerprint of these pixels confirms the material type (which is $MoS_2$ here) and the corresponding thickness, determined from the distance between the peak position of the in-plane (E_2g^1) and the out-of-plane (A_1g) phonon modes.

After fabrication, the physical security primitive was stimulated using a laser light to generate an optical response. We expected the response to be unique to the security primitive given the random thickness distribution of the CVD $MoS_2$ and the thickness dependence of the excitonic emissions in $MoS_2$. FIGS. 11D and 11E show the topographic images and photo-luminescence (PL) spectra of three pixels from the array, which comprise a full monolayer film, a full bilayer film, and a mixture of the two.

FIG. 11D shows topographic images of pixels 1108, 1110, and 1112. The pixels are covered with $MoS_2$ of different proportions: 1L (pixel 1108), 2L (pixel 1110), or mixture of 1L:2L (pixel 1112). The respective corresponding step height profiles are shown at 1128, 1120, and 1122 respectively. The boxes inside the step height plots 1128, 1120, and 1122 indicate the depth of the $SiO_2$ film which was over-etched during $MoS_2$ patterning in $CF_4/O_2$ plasma.

FIG. 11E shows the corresponding photoluminescence (PL) characteristics of pixels 1108, 1110, and 1112.

FIG. 11F illustrates that, using a combination of PL and AFM studies, a normalized quantum yield (QY) of several pixels with different fractional surface coverage $f_{1L}$ of monolayer 1108 was determined. The data suggests the increase of non-radiative recombinations with decreasing $f_{1L}$. In some embodiments, therefore, the ON/OFF classification threshold is set based on the photoemission properties of a pixel with $f_{1L}=0.5$.

The PL data illustrate the marked contrast between the full monolayer pixel and the full bilayer one. As a result, the binary (ON or OFF) classification of such pixels in the array is straightforward. In the case of a mixed pixel, however, the photoemission is expected to be a strong function of the monolayer coverage of the pixels. Considering that the growth process was tuned to obtain equal surface coverage by a continuous monolayer film and multilayer speckles, a pixel with monolayer areal coverage of 50% represents the most ambiguous case for classifying a pixel as ON or OFF. Therefore, we used the photoemission of such a mixed pixel as the ON/OFF threshold $\theta$. In this example, the threshold $\theta$ is 0.12. However, according to various embodiments, the threshold $\theta$ may change based on, for example, such factors as the process and/or material used.

The data in FIG. 11E shows that the ratio of the PL intensity of the mixed pixel to that of a full monolayer pixel (about 0.12) is noticeably smaller than the monolayer areal coverage of the mixed pixel (0.5). We noticed that this trend is consistent across the different arrays on the sample. To better understand this observation, we closely examined the PL spectra of multiple pixels with varying monolayer fractional surface coverage, from 0 (full bilayer) to 1 (full monolayer). We selected these pixels at random from different locations within the same array. To accurately determine the surface coverage of the monolayer film within each pixel, we performed atomic force microscopy (AFM). We calculated the total area under the PL emission curve for each pixel in the wavelength range of 580-770 nm (the integrated photoemission). Then, the integrated PL of the pixels were normalized with respect to that of a full monolayer pixel. To account for the difference in the monolayer content of these pixels, we divided the normalized integrated photoemission of each pixel by its monolayer fractional coverage. These final values provide a close approximation of the QY of these pixels relative to that of a full mono-layer pixel, which we refer to as the normalized QY.

From the normalized QY, we can glean qualitative information about the effective minority carrier lifetime of the pixels. To do so, we plotted the normalized QY of these pixels as a function of their fractional coverage of monolayer f1L in FIG. 11F. The normalized QY decreases monotonically with decreasing the monolayer surface coverage of the pixels. This trend suggests an increase in non-radiative carrier recombination in the monolayer portion of the pixels with reducing the monolayer surface coverage, possibly due to the dominance of edge recombination. From the discussion above, one will appreciate that while the selection of the ON/OFF threshold is strongly linked to the engineered CVD growth process, the absolute value of the PL threshold is governed by the physical properties of the material itself.

FIGS. 12A-12D show aspects of optical response and security metrics of an $MoS_2$ primitive, according to an example embodiment.

FIG. 12A is a spatial map 1202 of a normalized integrated photoemission for a 2D $MoS_2$ array. As shown, stimulating the 2D $MoS_2$ array with a laser light produces an optical response that is substantially unique to this primitive.

As shown in FIG. 12B, we converted the spatial map 1202 to a 2D array 1204 of zero and one binary bits by comparing the normalized integrated emission of each pixel in 1202 with the ON/OFF threshold $\theta$ of 0.12. The extracted 2D random binary code is shown here.

One will appreciate the possible effect of the pixel choice and spacing choice on the behavior of the security primitive. Considering CSR of the island growth and the equal surface coverage by the monolayer and multilayer $MoS_2$, the distribution of the ON and OFF pixels shows no or weak dependency on the pixel size and the pixel spacing in the 2D $MoS_2$ array. We confirmed this by fabricating multiple arrays with different pixel sizes and spacings, where the arrays demonstrated equal distribution of random ON and OFF pixels. Hence, the strength of the security primitive is robust to the pixel choice and spacing choice.

We next analyzed the security metrics of the 2D binary array. Three important metrics are typically used to evaluate the strength of a security primitive: uniqueness, repeatability, and uniformity.

Figure 12C:
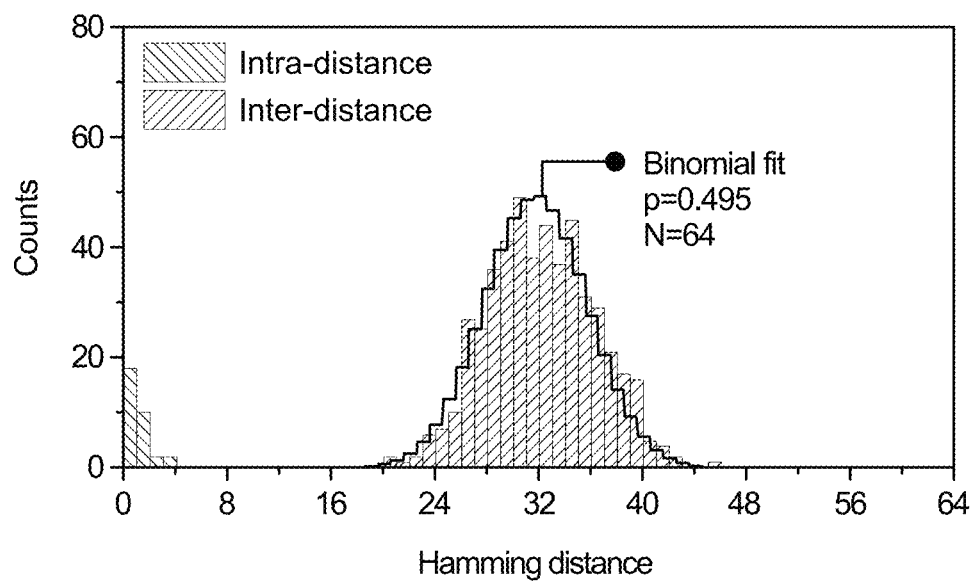

FIG. 12C shows that standard security tests confirm uniqueness and repeatability of the security keys. Uniqueness is the ability of a key to be distinguished from other keys. We use the average Hamming inter-distance to quantify uniqueness. The Hamming inter-distance between two keys is the minimum number of bit substitutions required to transform one key to another. The 32 rows of the 2D binary array 1204 of FIG. 12B are 64-bit security keys to be tested. We compute the Hamming inter-distance of all 496 possible pairs of keys. FIG. 12C shows the Hamming inter-distance distribution. As shown, a binomial distribution with parameters p=0.495 and N=64 provides a good fit based on the Kolmogorov-Smirnov test. The inverse of the binomial distribution at cumulative probability 0.05 is 25. This means that for two randomly generated 64-bit keys, there is a 95% probability that the keys differ in at least 25 bits. Hence, there is a 95% chance that it will require at least 64 choose 25 (or $4\times10^{17}$) worst-case number of attempts to guess an unknown key from another known key, meaning that each unknown key is substantially unique.

Consistency means that a random key must produce a consistent response to a given input challenge. The difference in response of a given binary key to the same challenge is quantified by the Hamming intra-distance, which represents the repeatability of the random binary code. Therefore, the ideal intra-distance is zero. FIG. 12C shows the results of the Hamming intra-distance, indicating high repeatability of the $MoS_2$ security keys. The observed bit error rates are measurement artifacts and originate from the limited spatial accuracy of the automated sample stage of the PL measurement system.

Figure 12D:
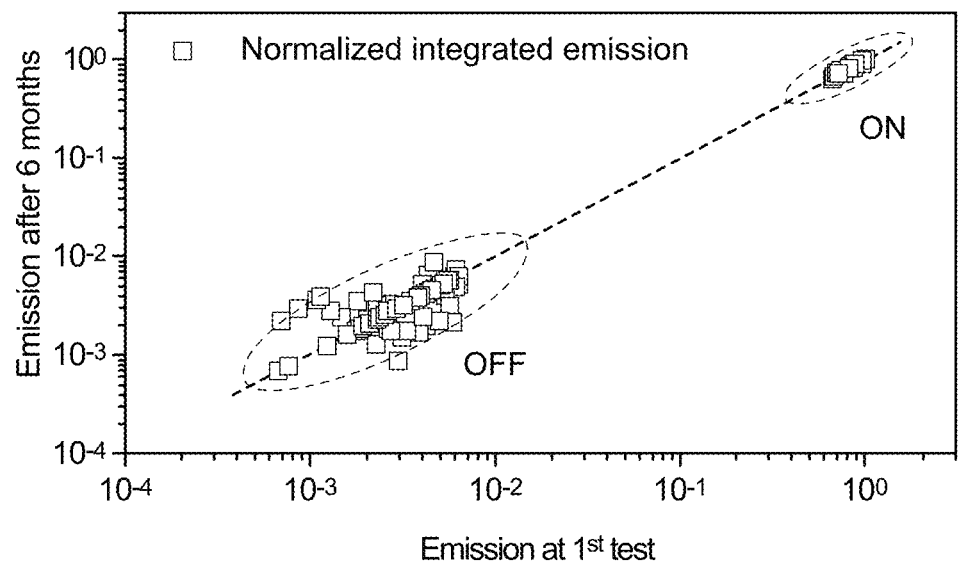

FIG. 12D shows that, by studying the aging properties of the photoemission for multiple $MoS_2$ pixels, we confirmed that the $MoS_2$ primitives are highly stable. The dashed line is to guide the eye and has a slope of 1. To investigate the long-term stability of the security primitives, we measured a random sample of 200 pixels after 6 months storage in ambient air. The candidate pixels had either high fractional areal coverage by a monolayer or a multilayer $MoS_2$ film. The unchanged emission properties of these pixels indicate that $MoS_2$ cryptographic primitives are highly stable.

To maximize the combination randomness of a binary array, each pixel should have an equal probability (i.e. 0.5) of being ON or OFF. This is defined as the uniformity property and is quantified by the Hamming weight of the key. Specifically, the Hamming weight indicates the number of bit substitutions to convert the key to an array of all zeros and has an ideal value of 0.5. We calculated the normalized Hamming weight on all 32 64-bit rows of the 2D binary array, and found the average to be 0.48. As described earlier, the measured Hamming weight is directly linked and controlled by selection of the ON/OFF threshold.

Figure 13:
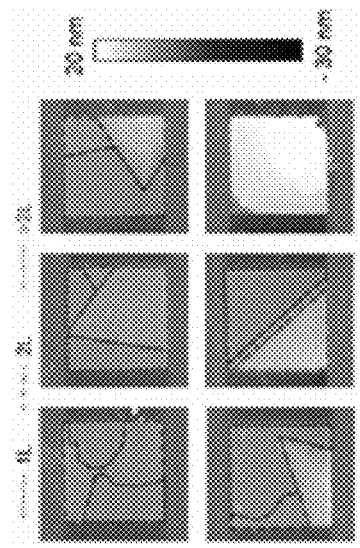
FIG. 13 shows representative atomic force microscopy (AFM) images of a few $MoS_2$ pixels having complex physical structures that contribute to unclonability of an $MoS_2$ primitive, according to an example embodiment.

FIG. 13 shows representative atomic force microscopy (AFM) images of a few $MoS_2$ pixels having complex physical structures that contribute to unclonability of the $MoS_2$ primitive, according to an example embodiment. To classify a random physical construct as a security primitive, it must be capable of preventing an unauthorized duplication of its physical structure, even if the adversary has full control of the PUF manufacturing. FIG. 13 illustrates the topographic images of several $MoS_2$ pixels from the 2D array 1204 of FIG. 12B. These images highlight the intricacy of the pixel structures. The heterogeneity of the thickness and the randomness of the spatial distribution of $MoS_2$ films within the pixels—originating from CSR of the multilayer island growth—make the 2D $MoS_2$ array physically unclonable. In contrast, a physical array of pixels constructed from randomly distributed monolayer islands in region I of FIGS. 8C-D (before they coalesce) can be replicated using standard nanofabrication techniques. Thus, the mere randomness of a physical construct, although necessary, is insufficient for realizing a security primitive.

VI. Physically Transient Taggants

Figure 14A:
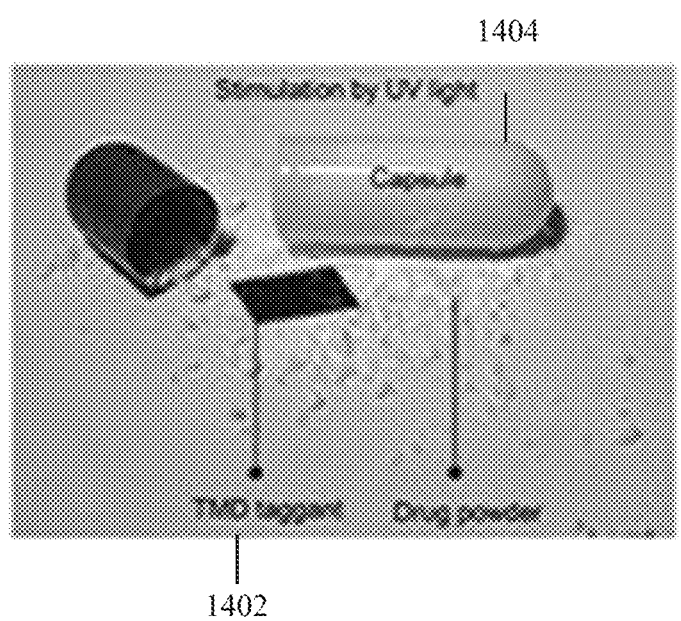
FIGS. 14A-14C show an implementation of physically transient optical TMD-based security taggants in a pharmaceutical supply chain, according to an example embodiment.
Figure 14B:
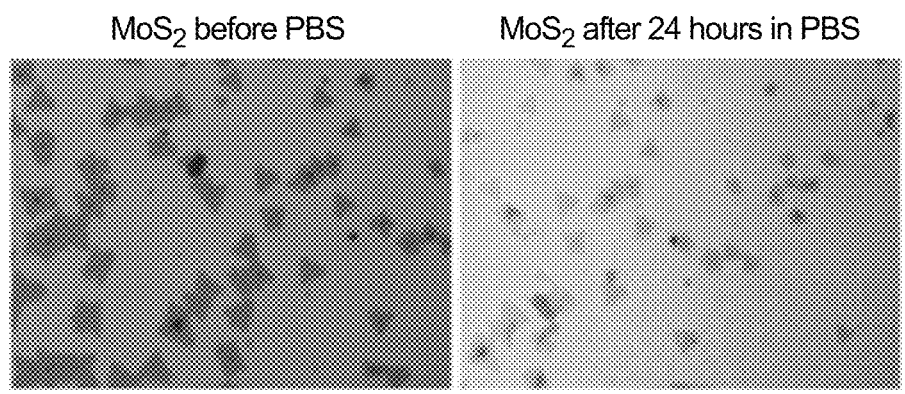
Figure 14C:
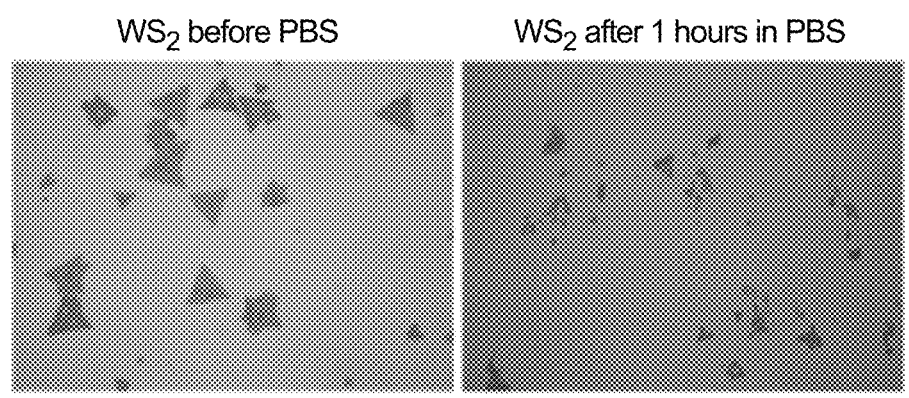

Disclosed herein is a class of TMD-based security taggants that are physically transient in that they disappear by design in the specific target environment. This property has implications for securing a wide-range of products from implantable devices, to drugs, to "green" disposable electronics. One contemplated embodiment includes producing physically transient taggants from tungsten disulfide ($WS_2$) and inserting them in pills, as shown in FIGS. 14A-C. These security taggants will resorb after entering the human body.

VII. Compound Implementations/Pairings with Other Structures

Globalization of supply chains has contributed to the rise of counterfeit products, including electronics, pharmaceuticals, food, clothing, and so on. Further, the ubiquity of today's advanced manufacturing poses additional challenges, because such resources are now more accessible to rogue entities for creating sophisticated counterfeit products. To protect the governments and the consumers from theft, counterfeiting, and fraud, one needs to develop approaches that can authenticate individual products and the entire supply chains.

Counterfeit drugs cause significant financial loss to the pharmaceutical industry and threaten public health. The pharmaceutical sector typically uses packaging-based authentication methods to combat counterfeit medicines, which are vulnerable to unauthorized duplication. The use of micro-taggants based on polymeric materials is emerging as a way to authenticate drugs. The conventional micro-taggants are inserted in the individual tablets and capsules during production and contain drug information. The materials used for this application should be bio-compatible and must dissolve in the body without leaving any traces. The conventional micro-taggants are generic and only contain information about the drug itself. In other words, the existing micro-taggants are not unique to each pill.

FIGS. 14A-14C show an implementation of physically transient optical TMD-based security taggants in a pharmaceutical supply chain, according to an example embodiment. We introduce the class of TMD-based security taggants that are physically transient. This property has important implications for securing a wide-range of products from implantable devices, to drugs, to "green" disposable electronics. To demonstrate this concept, physically transient taggants(s) 1402 from tungsten disulfide ($WS_2$) are inserted in pill(s) 1404, as shown in FIG. 14A.

FIG. 14B shows that $MoS_2$ is highly stable in phosphate buffer silane (PBS). In contrast, security taggants based on $WS_2$ resorb after entering the human body, as shown by the fact that $WS_2$ dissolves in PBS solution, which mimics the human body fluid (see FIG. 14C). Thus, it becomes possible to individually tag each pill using $WS_2$-based security taggants(s).

Another contemplated embodiment shows the versatility of TMD-based security taggants by applying them to low-cost Internet-of-Thing (IoT) electronics. In this application, molybdenum disulfide ($MoS_2$) is contemplated as the security material due to its chemical stability. TMD-based security taggants are integrated (e.g., deposited on top of) with the CMOS chips. In some embodiments, integrated image sensors are used for acquiring the optical response of the taggants.

Figure 15A:
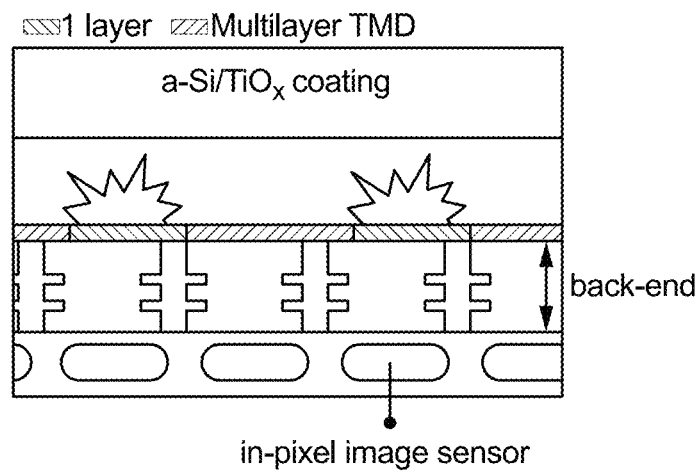
FIGS. 15A-15C show an implementation of physically transient optical TMD-based security taggants in complementary metal-oxide-semiconductor (CMOS)-based primitives used to secure an Internet-of-Things component, according to an example embodiment.
Figure 15B:
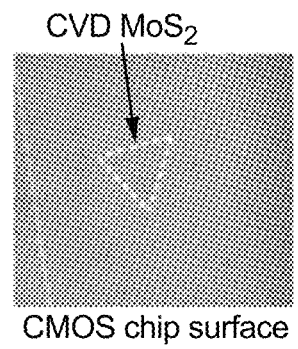
Figure 15C:
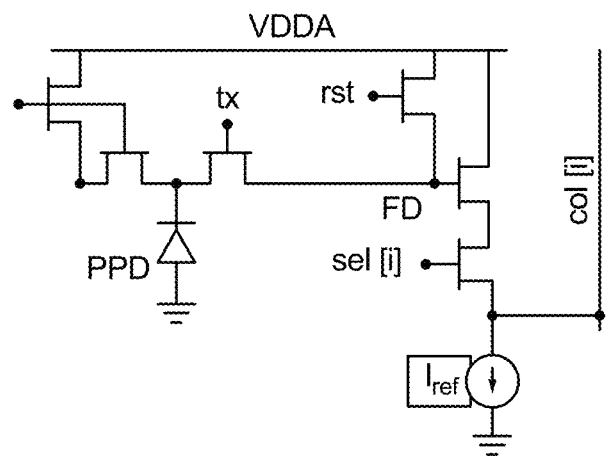

FIGS. 15A-15C show an implementation of one or more physically transient optical TMD-based security taggants in one or more complementary metal-oxide-semiconductor (CMOS)-based primitives, according to an example embodiment. In some embodiments, the security taggants may be configured and/or adapted to secure an Internet-of-Things device.

CMOS technologies are advantageous when building IoTs due to cost and leakage considerations. However, the small process variations pose a challenge for the design of PUFs. To secure this supply chain, disclosed herein is a hybrid TMD-security-taggant-CMOS primitive.

As shown in FIG. 15A, a 0.35 μm CMOS device is used, and one or more TMD security taggants are post-processed on top of the CMOS device. Two properties of the TMD security taggants make this possible: photo-emission in the visible range, allowing the use of CMOS image sensors for read-out, and the substrate-agnostic property of the TMD material, enabling integration with CMOS.

The TMD security taggant is a passive element. Hence, it does not require wiring to the CMOS, significantly simplifying post-processing. One can directly mount the TMD taggant on the CMOS chip, even without needing any patterning to define the pixel size. In some embodiments, the pixel size is determined using back-end metals, which optically isolates the neighboring image sensors from one another.

FIG. 15B shows the results for layer transfer of CVD $MoS_2$ onto a CMOS chip. A read-out circuit is implemented using a small six-transistor column amplifier shown in FIG. 15C.

In some cases, it is desired to hide the optical response of the TMD taggants. The effectiveness of a thin (e.g., less than 50 nm) coating layer based on a stack of amorphous silicon (a-Si) and titanium oxide ($TiO_x$) can be studied. Considering the absorption coefficient of a-Si, no light emits from TMD to the outside. The etch resistance of $TiO_x$ prevents reverse engineering of the taggants, such as delayering the coating above the TMD film. Considering the small thickness of the stack and the resistance of the TiOx film to many chemicals, any physical attack to access the TMD will destroy the TMD film.

VIII. Plasmonics

FIGS. 16A-16F show a plasmonic $MoS_2$ structure, according to an example embodiment. Plasmonic devices are nanoscale apparatuses (e.g., amplifiers, antennas) that can be used to amplify the photo-emission intensity of the TMDs. The set of embodiments including one or more plasmonics devices is contemplated to facilitate read-out of the optical response of the TMD taggants using, for example, cameras in smartphones.

Figure 16C:
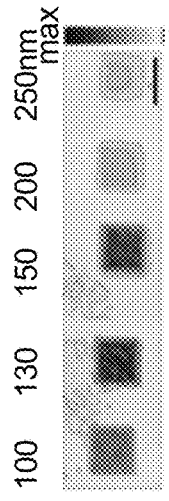
FIGS. 16A-16F show a plasmonic $MoS_2$ structure, according to an example embodiment.
Figure 16B:
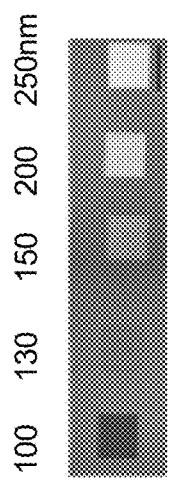
Figure 16A:
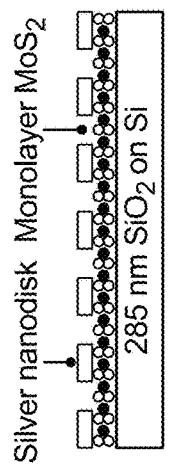
Figure 16F:
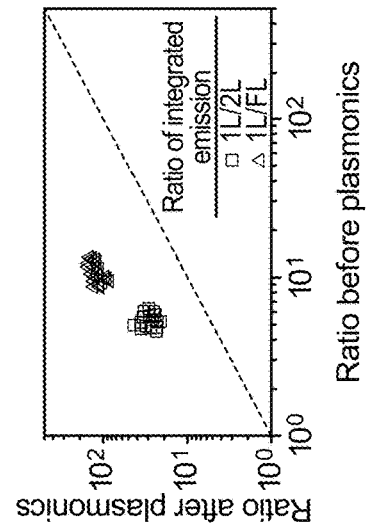
Figure 16E:
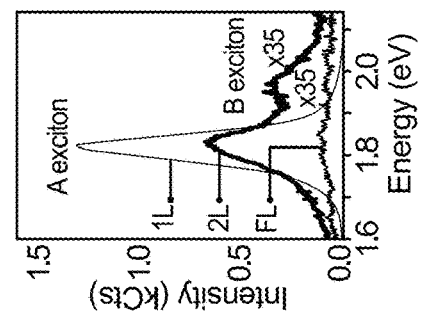
Figure 16D:
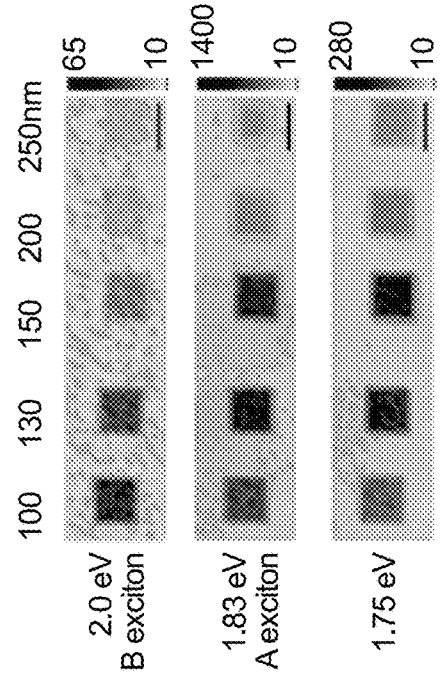

The effect of plasmonics is contemplated to enhance the contrast between ON and OFF pixels. The highest boost of light emission occurs at the energy corresponding to the bandgap of the material, caused by the coupling of the plasmonic resonance to the excitation field. It is contemplated that the plasmonic/$MoS_2$ structure could remarkably enhance the emission contrast between the ON and OFF pixels, as shown in FIG. 16F. This boosts the robustness of the response in the presence of environmental disturbances and thereby improves the reliability of the TMD-based taggants. In the example embodiment, the plasmonic array is deposited directly above the film comprising the security primitive.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An article of manufacture comprising:
   a substrate;
   a security primitive on the substrate, the security primitive comprising a transition metal dichalcogenide having a varying thickness.

2. The article of manufacture of claim 1, wherein the transition metal dichalcogenide is deposited on the substrate, and wherein the transition metal dichalcogenide has a formula $MX_{(2-a)}Y_a$, where X and Y are two different chalcogen atoms and a is less than or equal to 2 and greater than or equal to 0.

3. The article of manufacture of claim 1, wherein the transition metal dichalcogenide comprises a chalcogen atom (X) selected from the group consisting of S, Se, and Te and a transition metal (M) selected from the group consisting of Mo, W, Hf, and Zr.

4. The article of manufacture of claim 3, wherein the security primitive has a thickness defined by one or more layer; and wherein a number of layers in the one or more layers is in a range of 1 to 200.

5. The article of manufacture of claim 4, wherein the security primitive has a physical structure comprising a first layer of X adjacent to a second layer of M, the second layer of M adjacent to a third layer of X, such that an $MX_2$ is formed.

6. The article of manufacture of claim 1, wherein the security primitive has an area between 10 um² to 1000 um².

7. The article of manufacture of claim 1, wherein the security primitive is divided into a plurality of discrete regions, the plurality of discrete regions comprising a first region and a second region different from the first region, the first region having a first luminescence and the second region having a second luminescence.

8. The article of manufacture of claim 1, the article further comprising an optical reader and a controller, wherein the security primitive is readable by the controller configured to:
   identify the first region by evaluating the first luminescence value supplied by the optical reader;
   identify the second region by evaluating the second luminescence value supplied by the optical reader; and
   build a security primitive key, the security primitive key comprising a first set of data values corresponding to a first set of coordinates of the first region and a second set of data values corresponding to a second set of coordinates of the second region.

9. The article of manufacture of claim 7, wherein the first region has a first thickness and the second region has a second thickness different from the first thickness.

10. The article of manufacture of claim 8, wherein at least one of the plurality of discrete regions is configured to have a substantially weak luminescence.

11. The article of manufacture of claim 1, further comprising a coating layer having a coating layer thickness of up to 50 nm, the coating layer comprising amorphous silicon (a-Si) and titanium oxide ($TiO_x$).

12. The article of manufacture of claim 11, wherein the transition metal dichalcogenide is $WS_2$, and wherein the security primitive is configured to be destroyed in response to a predetermined condition, further wherein the predetermined condition includes introducing the article of manufacture to a phosphate buffer silane (PBS) solution or a chemical equivalent.

13. The article of manufacture of claim 1, further comprising a plasmonic device coupled to the security primitive.

14. An optical reader coupled to a controller, the controller configured to:
   digitally capture, through the optical reader, a read-out of a security primitive, the security primitive comprising a transition metal dichalcogenide disposed on a substrate;
   identify, on the read-out, a first region of the security primitive, by evaluating a first luminescence of the first region;
   identify, on the read-out, a second region of the security primitive by evaluating a second luminescence of the second region; and
   build a security primitive key, the security primitive key comprising a first set of data values corresponding to a first set of coordinates of the first region and a second set of data values corresponding to a second set of coordinates of the second region.

15. The optical reader of claim 14, wherein the controller is configured to:
   access an electronic verification item; and
   verify the security primitive key by evaluating the security primitive key against the electronic verification item.

16. The optical reader of claim 15, the optical reader comprising a complementary metal-oxide-semiconductor base, wherein the substrate is attached to the base.

17. The optical reader of claim 15, the optical reader being coupled to a photographic device.

18. A method of manufacturing a security primitive comprising:
   providing a substrate;
   depositing a transition metal dichalcogenide on the substrate to form the security primitive, the deposited transition metal dichalcogenide configured to have a variable thickness; and
   pixelating the security primitive into a plurality of discrete regions.

19. The method of claim 18, further comprising enhancing photoluminescence of the deposited transition metal dichalcogenide.

20. The method of claim 18, further comprising querying the Raman peak resonance of each of the plurality of discrete regions.

21. The method of claim 18, further comprising verifying the security primitive by querying a database.

* * * * *